United States Patent
Suzuki

[11] Patent Number: 6,052,366
[45] Date of Patent: Apr. 18, 2000

[54] COMMUNICATION METHOD AND COMMUNICATION SYSTEM

[75] Inventor: Mitsuhiro Suzuki, Chiba, Japan

[73] Assignee: Sony Corporation, Tokyo, Japan

[21] Appl. No.: 08/915,759

[22] Filed: Aug. 21, 1997

[30] Foreign Application Priority Data

Aug. 23, 1996 [JP] Japan .................................. 8-222931

[51] Int. Cl.[7] ............................................. H04J 3/18
[52] U.S. Cl. ................................... 370/342; 370/479
[58] Field of Search ................................. 370/328, 330, 370/331, 334, 335, 337, 342, 441, 477, 484, 210, 343; 455/434

[56] References Cited

U.S. PATENT DOCUMENTS

| | | | |
|---|---|---|---|
| 4,644,560 | 2/1987 | Torre et al. ............................. | 370/342 |
| 5,541,552 | 7/1996 | Suzuki et al. ........................... | 329/307 |
| 5,621,786 | 4/1997 | Fisher et al. ............................ | 370/331 |
| 5,722,074 | 2/1998 | Muszynski .............................. | 370/331 |
| 5,778,316 | 7/1998 | Persson et al. .......................... | 455/434 |
| 5,896,419 | 4/1999 | Suzuki .................................... | 375/219 |
| 5,966,644 | 10/1999 | Suzuki .................................... | 455/76 |
| 5,970,047 | 10/1999 | Suzuki .................................... | 370/210 |

OTHER PUBLICATIONS

Theodore S. Rappaport, Wireless Communications Principles and Practice, Prentice Hall, Inc., 1996.

*Primary Examiner*—Huy D. Vu
*Assistant Examiner*—Alexander Boakye
*Attorney, Agent, or Firm*—Jay H. Maioli

[57] ABSTRACT

A transmission method in a predetermined transmission bandwidth with a predetermined transmission format for a multiple access includes coding a signal at a position for managing a multiple access and transmitting a coded signal to base stations, modulating the coded signal at the base stations, respectively; and transmitting an output signal obtained by modulating the base stations.

16 Claims, 23 Drawing Sheets

COMMUNICATION METHOD AND COMMUNICATION SYSTEM

BACKGROUND OF THE INVENTION

1. Field of the Invention

The present invention relates to a communication method and a communication system suitable for application to a base station and an exchange of a radio telephone system, for example.

2. Description of the Related Art

In a mobile communication such as a radio telephone system or the like, a multiple access in which a plurality of mobile stations (terminal apparatus or subscribers) are permitted to access a single base station is employed. In the case of a radio telephone, a number of mobile stations commonly utilize a single base station. Therefore, various communication systems have been proposed for avoiding interference between respective mobile stations. For example, a frequency division multiple access (FDMA) system, a time division multiple access (TDMA) system, a code division multiple access (CDMA) system and so on are conventionally proposed as this kind of communication systems.

Of these systems, the CDMA system is a multiple access system in which a particular code is assigned to each of the mobile stations, a modulated wave of an identical carrier wave (carrier) is spread in spectrum with the code and then transmitted to the identical base station, and a base station receives it with taking code synchronism based on each code to identify a desired mobile station.

Specifically, the base station occupies the whole frequency band owing to the spectrum, and transmits signals to a plurality of mobile stations using an identical frequency band at the same time. Each of the mobile stations inversely spreads a signal of a fixed spread band width transmitted from the base station to extract a corresponding signal. Further, the base station discriminates each of the mobile stations by different spread codes one another.

In the CDMA system, communication can be achieved at every direct calling so long as a code is shared. Further, the system is excellent in secrecy of telephone conversation. Therefore, the system is suitable for a radio transmission utilizing mobile stations such as a portable telephone apparatus and so on.

In the CDMA system, it is difficult to establish a precise communication relationship between mobile stations. Therefore, each communication between respective mobile stations cannot be dealt completely separately, and hence another mobile station can become a source of interference upon communication with a mobile station. Further, data is spread within a particular frequency band in this system. Therefore, it is necessary to define a band width in advance over which the data is spread (i.e., a band width for use of transmission). Therefore, it is difficult to change the transmission band width.

The above matter will be described more concretely. FIGS. 1A and 1B shows a model in which a transmission signal of a particular user is extracted by an inverse spread from transmission signals of eight mobile stations (users) which are spectrum spread with predetermined codes and multiplexed, for example. As shown in FIG. 1A, if a signal of a user U0 is to be extracted by the inverse spread from signals of eight users U0 to U7 which are multiplexed with codes, then as shown in FIG. 1B, the signal of the user U0 can actually be extracted. However, signals of other users U1 to U7 which are dealt by the same base station also become an interference source, serving as a noise. This fact results in deterioration of an S/N characteristic. For this reason, in a radio transmission employing the CDMA system, electric wave does not reach well due to the deterioration caused by the interference, which fact narrows a service area. Further, interference due to other users can be suppressed only by an amount of inverse spread gain which is obtained in a process of spectrum inverse spread. Therefore, a number of users (mobile stations) permitted to access is limited and a channel capacity becomes small.

Since the inverse-spread band width is usually fixed and the number of users whose signals can be multiplexed is limited, it is impossible to flexibly cope with a frequency allocation which is different depending upon each nation. Therefore, only a comparatively narrow band width can be defined, and a maximum user rate is also limited.

To solve this problem, it is proposed that a communication system different from the CDMA system and the TDMA system is applied to a radio telephone system. If a communication system which is complicated as compared with the CDMA system and the TDMA system is employed, the base station for generating a signal used for communicating with each terminal must carry out a complicated processing, which considerably complicates an arrangement of the base station. In particular, in a cellular system, one base station is required in each cell, and, moreover, base stations of very large number are required to secure a wide service area. Consequently, as the arrangement of the base station becomes complicated, an arrangement of the radio telephone system becomes very complicated.

A general base station for a radio telephone is connected to an exchange through a dedicated digital circuit. The base station subjects data transmitted through a digital circuit to channel coding for a radio transmission and then modulates it in accordance with a predetermined communication system, for transmitting the data from an antenna connected to the base station by wireless. If the base station carries out all the processing including a processing of coding data for a radio transmission and so on and the coding system is changed, corresponding circuits of all the base stations must be changed. It is almost impossible to carry out a system change in which a higher communication system is applied to an existing radio telephone system.

If the base station processes a comparatively complicated data, when a hand-off processing for switching a base station for communicating with a terminal apparatus is carried out due to positional movement of the terminal apparatus, both of a base station which has communicated with the terminal apparatus before the hand-off processing and a base station communicating with the terminal apparatus after the hand-off processing must carry out the complicated data processing, and hence it takes a comparatively long time to switch the base station. As a result, a telephone call is temporarily interrupted, which prevents a telephone call from being made on a real time base.

SUMMARY OF THE INVENTION

In view of such aspects, it is an object of the present invention to provide an efficient communication system as a radio telephone system and to simplify a system arrangement of a base station or the like and control thereof when the communication system is employed.

According to an aspect of the present invention, a transmission method in a predetermined transmission band width with a predetermined transmission format for a multiple access, includes a coding step of coding signal at a position for managing a multiple access and transmitting a coded signal to a plurality of base stations, a modulating step of modulating the coded signal at the plurality of base stations, respectively; and a transmitting step of transmitting an output signal obtained in the modulating step at the plurality of base stations.

DESCRIPTION OF THE PREFERRED EMBODIMENTS

A communication method and a communication apparatus according to an embodiment of the present invention will hereinafter be described with reference to FIG. 2 to FIG. 23.

Initially, a communication system to which the present embodiment is applied will be described. The communication system of the present embodiment is arranged as a so-called multicarrier system in which a plurality of subcarriers are continuously disposed within a band allocated in advance, and the plurality of subcarriers within the single band are utilized on a single transmission path at the same time. Further, the plurality of subcarriers within the single band are collectively divided in the band to be modulated. Here, this system is called a band division multiple access (BDMA: Band Division Multiple Access).

Figure 1A:
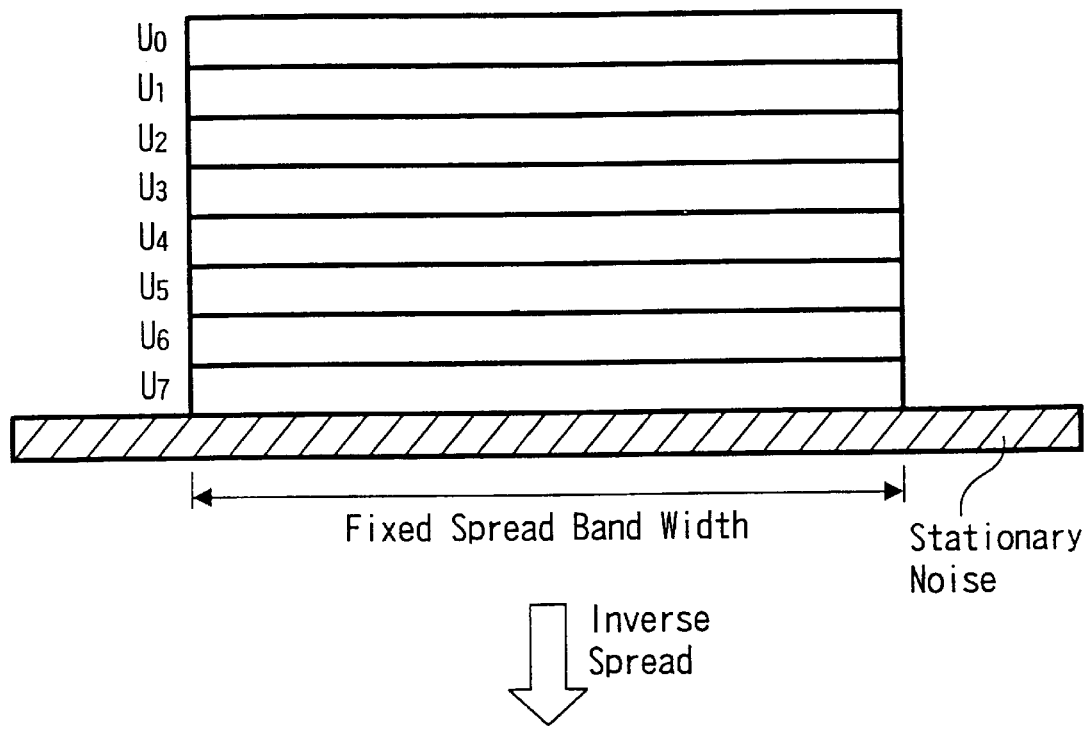
FIGS. 1A and 1B are diagrams each used to explain an interference state in a CDMA system.
Figure 1B:
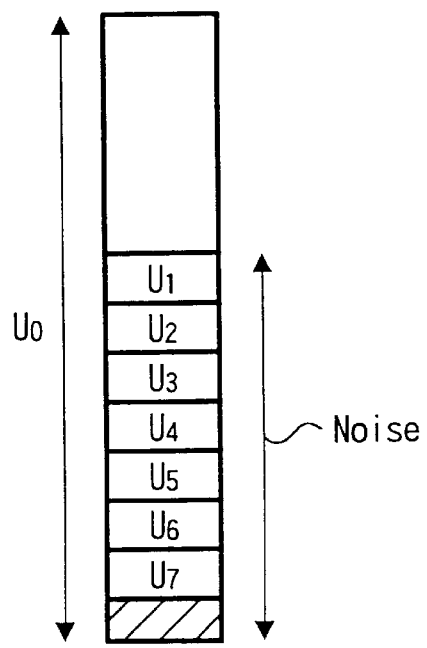
Figure 2:
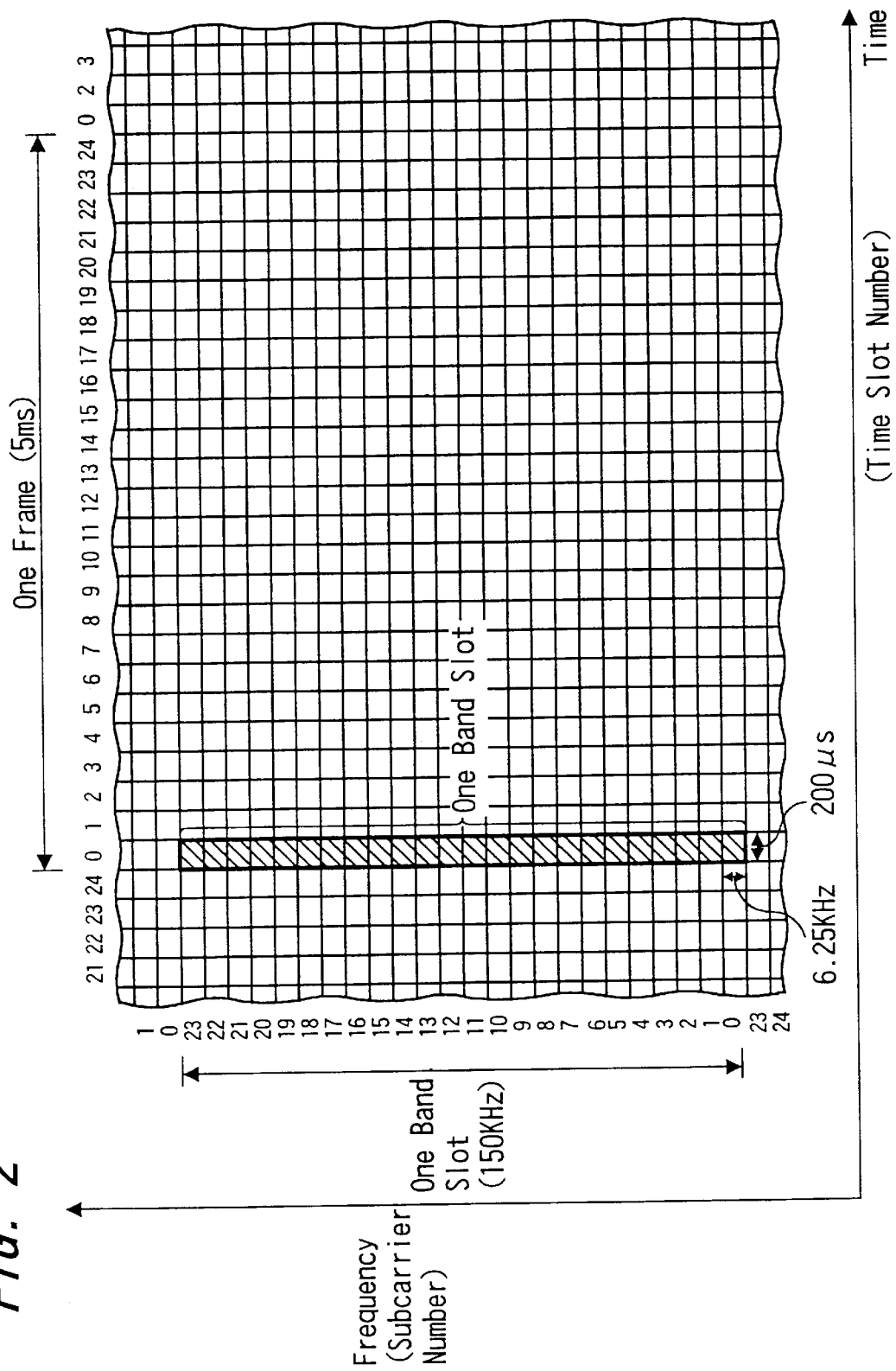
FIG. 2 is a diagram used to explain a slot arrangement of a transmission signal used in a communication apparatus according to an embodiment of the present invention.
Figure 3:
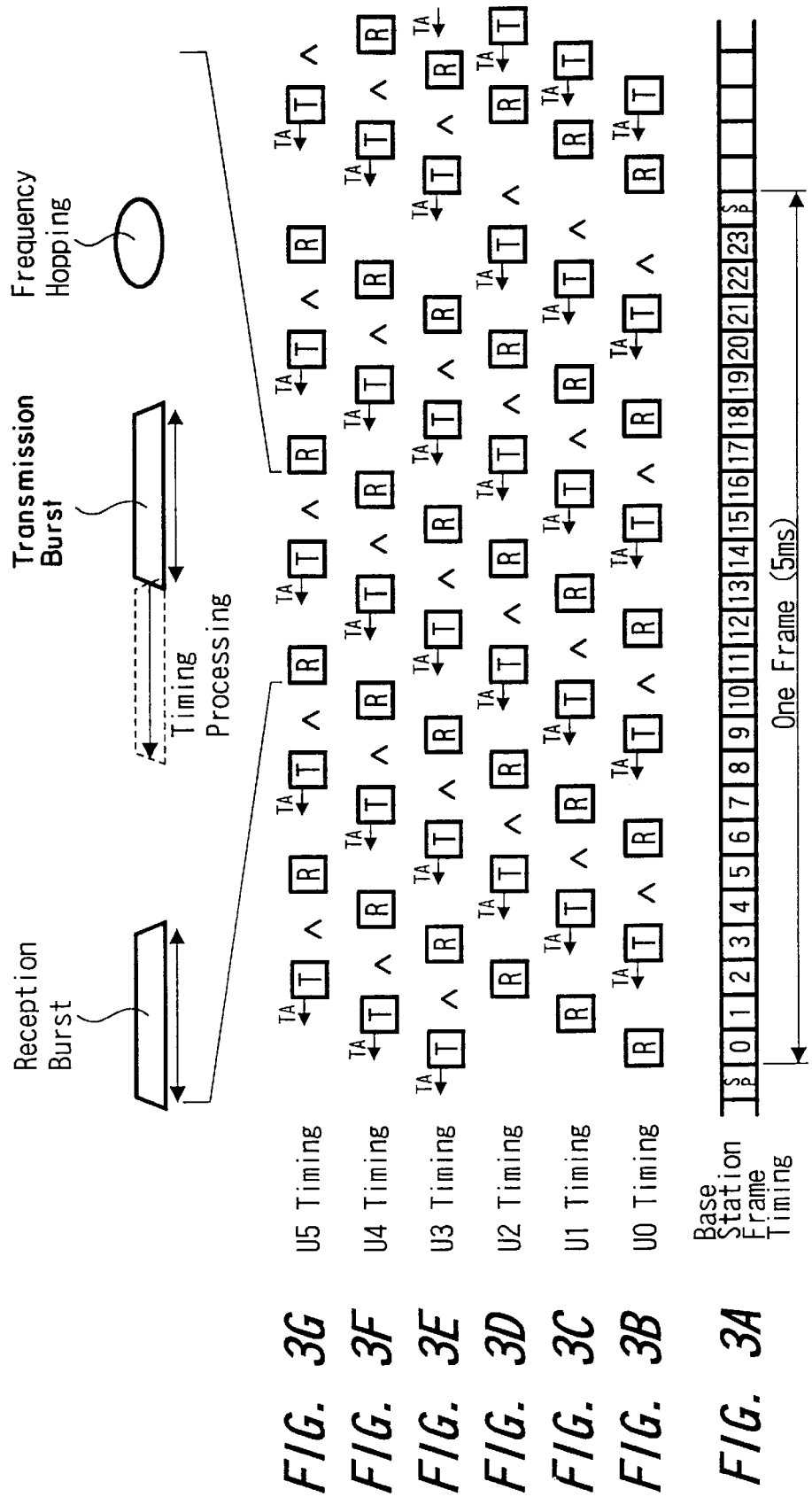
FIGS. 3A to 3G are diagrams each used to explain a transmission state in a frame according to the embodiment.

The arrangement thereof will be described below. FIG. 2 is a diagram showing a slot arrangement of transmission signals of the present embodiment in which a frequency is set in the ordinate thereof and a time is expressed on the abscissa thereof. In the present example, the frequency-axis and the time-axis are divided in a lattice fashion to provide an orthogonal base system. Specifically, the transmission band width of one transmission band (one band slot) is set to 150 KHz and the one transmission band of the 150 KHz includes therein 24 subcarriers. The twenty-four subcarriers are disposed continuously with an equal interval of 6.25 KHz, and every carrier is assigned with a subcarrier number from 0 to 23. However, practically existing subcarriers are allocated to bands of subcarrier numbers of 1 to 22. Bands of both end portions of the one band slot, i.e., bands of subcarrier numbers of 0 and 23 are assigned with no subcarrier, i.e., they are made to serve as a guard band and their electric power is set to zero.

One time slot is regulated at an interval of 200 μsec. in terms of the time-axis. A burst signal is modulated and transmitted together with 22 subcarriers at every time slot. One frame is defined as an array of 25 time slots (i.e., 5 msec.). Each of the time slots within one frame is assigned with a time slot number from 0 to 24. A hatched area in FIG. 2 represents a section of one time slot in one band slot. In this case, a time slot assigned with a slot number of 24 is a period in which no data is transmitted.

Multiple access in which a plurality of mobile stations (terminal apparatus) carry out communication with a base station at the same period, is carried out by using the orthogonal base system which derives from dividing the frequency-axis and time-axis in a lattice fashion. Connection condition with respective mobile stations is arranged as shown in FIGS. 3A to 3G. FIGS. 3A to 3G are diagrams each showing an operation condition indicating that how six mobile stations are connected to the base station by using time slots U0, U1, U2, . . . , U5 with one band slot (actually utilized band slot is changed owing to a frequency hopping which will be described later). A time slot represented by R is a reception slot while a time slot represented by T is a transmission slot. As shown in FIG. 3A, a frame timing regulated in the base station is set to a period including 24 time slots (of the 25 time slots, the last slot, i.e, a slot of number 24 is not utilized). In this case, the transmission slot is transmitted using a band different from one of the reception slot.

The mobile station U0 shown in FIG. 3B uses time slots of time slot numbers, 0, 6, 12, 18 within one frame as a reception slot, while time slots of time slot numbers, 3, 9, 15, 21 as a transmission slot. A burst signal is received or transmitted in each time slot. The mobile station U1 shown in FIG. 3C uses time slots of time slot numbers, 1, 7, 13, 19 within one frame as a reception slot, while time slots of time slot numbers, 4, 10, 16, 22 as a transmission slot. The mobile station U2 shown in FIG. 3D uses time slots of time slot numbers, 2, 8, 14, 20 within one frame as a reception slot, while time slots of time slot numbers, 5, 11, 17, 23 as a transmission slot. The mobile station U3 shown in FIG. 3E uses time slots of time slot numbers, 3, 9, 15, 21 within one frame as a reception slot, while time slots of time slot numbers, 0, 6, 12, 28 as a transmission slot. The mobile station U4 shown in FIG. 3F uses time slots of time slot numbers, 4, 10, 16, 22 within one frame as a reception slot, while time slots of time slot numbers, 1, 7, 13, 22 as a transmission slot. Further, the mobile station U5 shown in FIG. 3G uses time slots of time slot numbers, 5, 11, 16, 22 within one frame as a reception slot, while time slots of time slot numbers, 2, 8, 14, 20 as a transmission slot.

Since the arrangement shown in FIGS. 3A to 3G is employed, six time-division multiple access (TDMA) in which six mobile stations accesses one band slot is carried out. In view of each of the mobile stations, there is a spare period of two time slots (i.e., 400 $\mu$sec.) from completion of reception or transmission of one time slot period to start of next transmission or reception. Each of the mobile stations carries out a timing processing and a processing called a frequency hopping by utilizing this spare period. Specifically, each of the mobile stations carries out a timing processing TA for agreeing a transmission timing with a timing of a signal transmitted from a base station during after 200 $\mu$sec. have passed before each transmission slot T. and carries out the frequency hopping for switching a band slot used for transmission and reception to another band slot after about 200 $\mu$sec. have passed since completion of each transmission slot T. Since the above timing is one used when the transmission rate is set high, if the transmission rate is set low and the number of the band slot to be used is changed, then it is necessary to set the timing for the frequency hopping again. The frequency hopping permits a plurality of band slots prepared for one base station to be used by each of the mobile stations equally.

Specifically, a plurality of band slots are allocated to a single base station. In a case of a cellular system in which one base station forms one cell, if a band of 1.2 MHz is allocated to one cell, eight band slots can be allocated to one cell. Similarly, if a band of 2.4 MHz is allocated to one cell, 16 band slots can be allocated to one cell; if a band of 4.8 MHz is allocated to one cell, 32 band slots can be allocated to one cell; and if a band of 9.6 MHz is allocated to one cell, 64 band slots can be allocated to one cell. Then, a frequency switching processing called the frequency hopping is carried out so that a plurality of band slots allocated to one cell are utilized uniformly. In the present example, a plurality of band slots of which frequencies are continuous are allocated to one cell.

Figure 4:
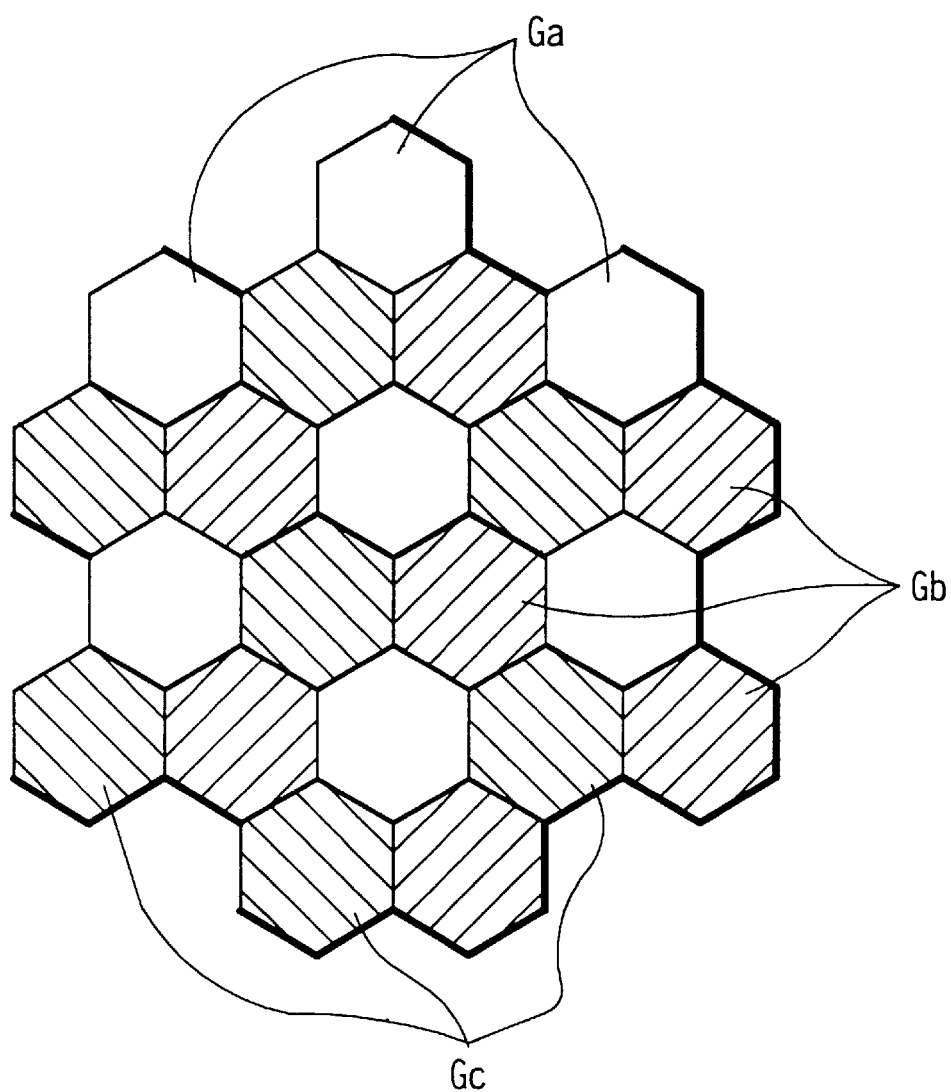
FIG. 4 is a diagram used to explain an example of a cell arrangement according to the embodiment.
Figures 5A, 5B, 5C:
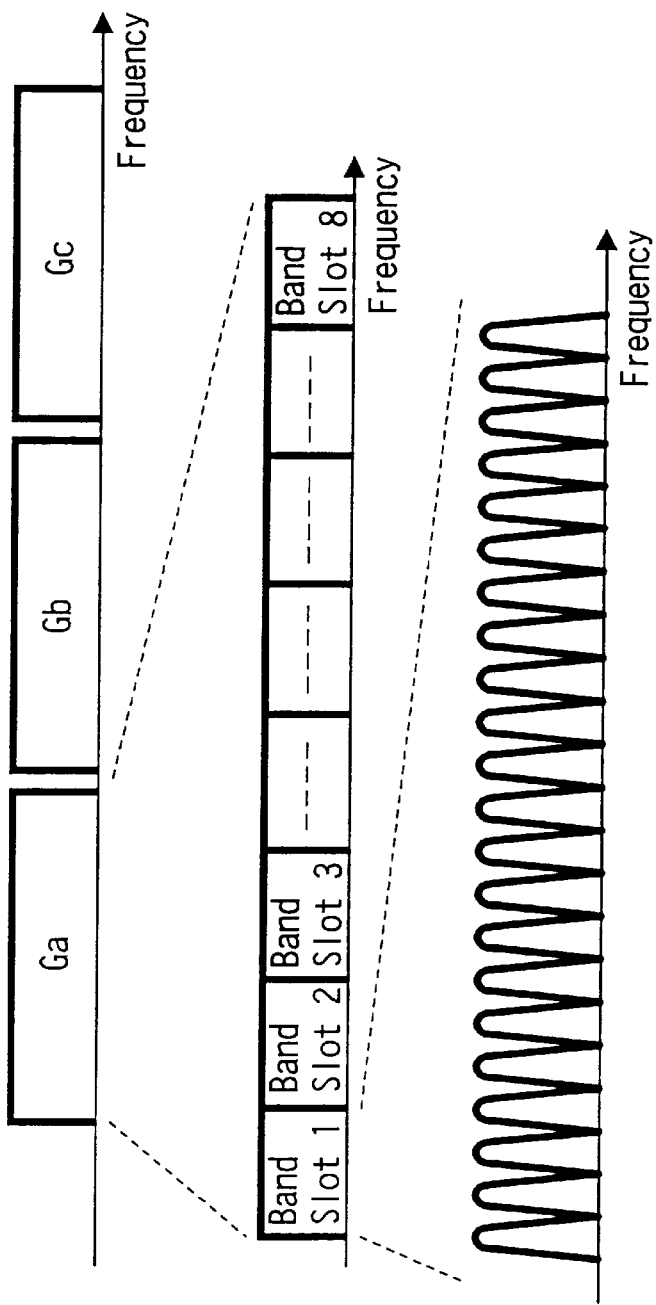
FIGS. 5A to 5C are diagrams each used to explain an example of a band slot arrangement according to the embodiment.

FIG. 4 shows an ideal layout of cells. If cells are arrayed in this manner, three kinds of frequencies are sufficient to allocate to all cells, i.e., a frequency is allocated to cells of a group Ga using a first band, another frequency is allocated to cells of a group Gb using a second band, still another frequency is allocated to cells of a group Gc using a third band. That is, if one cell uses eight band slots, as shown in FIGS. 5A and 5B, continuous eight band slots are prepared for the group Ga, the next continuous eight band slots are prepared for the group Gb and the next continuous eight band slots are prepared for the group Gc. In this case, as shown in FIG. 5C, each band slot includes 22 subcarriers, and a multicarrier transmission is carried out using the plurality of subcarriers at a time. As shown in FIGS. 3A to 3G, communication with a mobile station within the cell is carried out while carrying out the frequency hopping that band slots for multicarrier transmission are changed.

The communication condition is settled as above so that a signal transmitted between each mobile station and the base station is maintained to have orthogonal property with respect to other signals. Therefore, the signal will not suffer from interference from other signals and only a corresponding signal can be extracted satisfactorily. Since a band slot utilized for transmission is changed at any time by the frequency hopping, the transmission bands prepared for each base station is effectively utilized, which leads to effective transmission. In this case, as described above, a frequency band to be allocated to one base station (cell) can be freely settled. Therefore, a system can be freely settled depending on a used situation.

Next, an arrangement of a terminal apparatus (mobile station) which carries out communication with the base station in the above-described system will be described. In this case, a band of 2.0 GHz is utilized as a down-link from the base station to the terminal apparatus while a band of 2.2 GHz is utilized as an up-link from the terminal apparatus to the base station.

Figure 6:
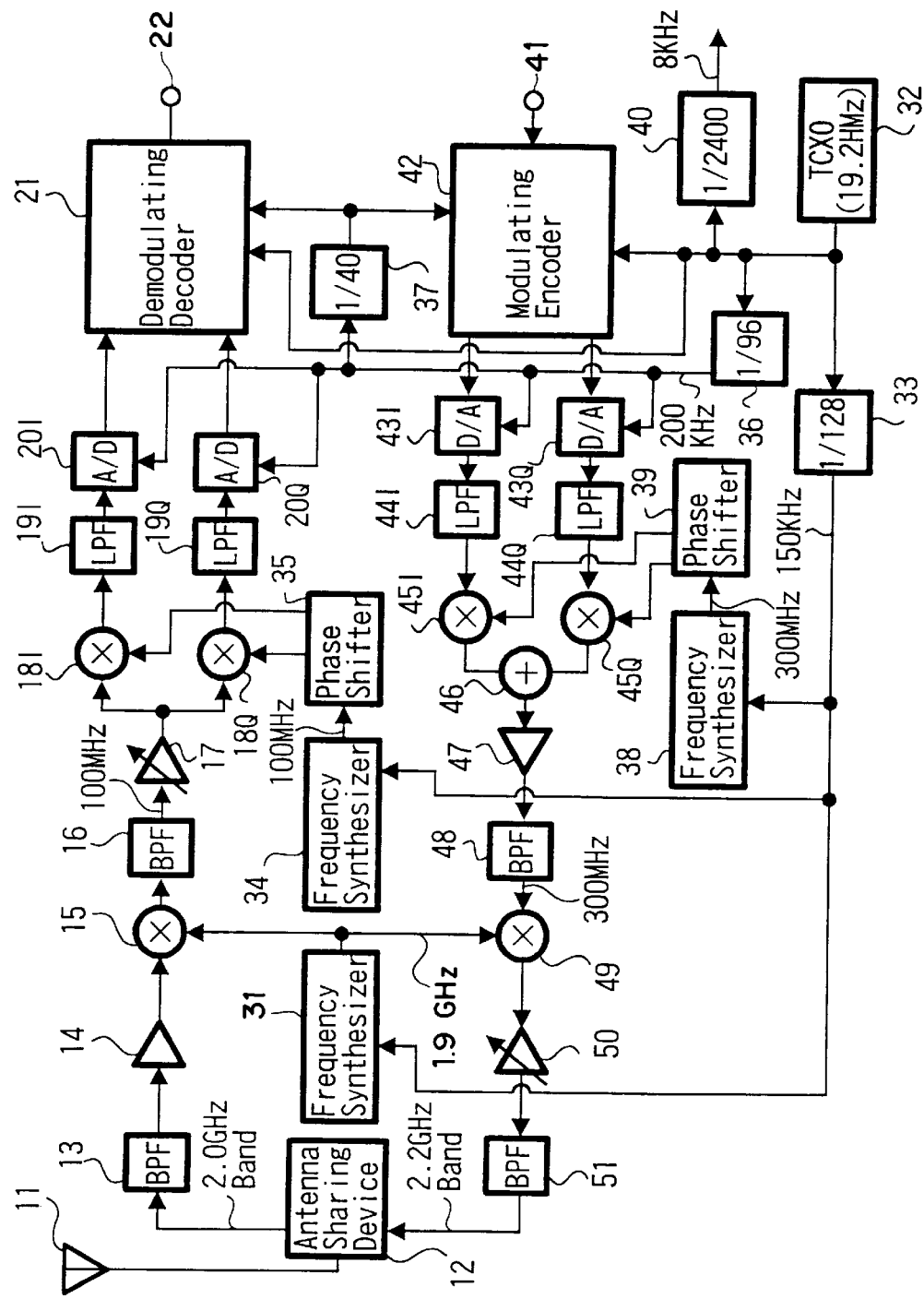
FIG. 6 is a block diagram showing an arrangement of a terminal apparatus according to an embodiment of the present invention.

FIG. 6 is a diagram showing an arrangement of the terminal apparatus. A reception system thereof will be described first. An antenna 11 serving for transmitting and receiving a signal is connected to an antenna sharing device. The antenna sharing device 12 is connected at its received signal output side with a band-pass filter 13, a reception amplifier 14 and a mixer 15 in series. The band-pass filter 13 extracts a signal of the 2.0 GHz band. The mixer 15 mixes the ioutput from the band-pass filter with a frequency signal of 1.9 GHz output from a frequency synthesizer 31 so that the received signal is converted into an intermediate frequency signal of a 100 MHz. The frequency synthesizer 31 is formed of a PLL (phase-locked-loop circuit), and it is a synthesizer for generating signals in a band of 1.9 GHz with an interval of 150 kHz (i.e., one band slot interval) based on a signal of 150 kHz which is generated by frequency-dividing a signal of 19.2 MHz output from a temperature compensation type crystal oscillator (TCXO) 32 by a $\frac{1}{128}$ frequency divider 33. Other frequency synthesizers, which will be described later on, utilized in the terminal apparatus are also formed of a PLL circuit.

The intermediate frequency signal output from the mixer 15 is supplied through a band-pass filter 16 and a variable gain amplifier 17 to two mixers 18I, 18Q useful for demodulation. A frequency signal of 100 MHz output from a frequency synthesizer 34 is supplied to a phase shifter 35 in which the signal is made into two system signals of which phases are shifted from each other by 90 degrees. One of the two-system frequency signals is supplied to the mixer 18I while the other of the same is supplied to the mixer 18Q so that they are mixed with the intermediate frequency signal respectively, whereby an I component and a Q component contained in the received data are extracted. The frequency synthesizer 34 is a synthesizer for generating a signal of 100 MHz band based on the signal of 150 kHz generated by frequency-dividing of the 1/128 frequency-divider 33.

Then, the extracted I-component is supplied through a low-pass filter 19I to an analog-to-digital converter 20I in which the component is converted into digital I data. The extracted Q-component is supplied through a low-pass filter 19Q to an analog-to-digital converter 20Q in which the component is converted into digital Q data. In this case, the respective analog-to-digital converters 20I, 20Q use a clock of 200 kHz as a clock for conversion which is generated by dividing a clock of 19.2 MHz output from the TCXO 32 by a 1/96 frequency divider 36.

Then, the digital I data and digital Q data output from the analog-to-digital converters 20I, 20Q are supplied to a demodulating decoder 21 in which demodulated reception data is obtained at a terminal 22. The demodulating decoder 21 is supplied with the clock of 19.2 MHz output from the TCXO 32 as a clock as it is, and also supplied with a clock of 5 kHz generated by frequency-dividing the clock of 200 kHz output from the 1/96 frequency divider 36 by a 1/40 frequency-divider 37. The clock of 5 kHz is utilized for generating slot timing date. Specifically, in the present example, one time slot is set to 200 μsec. as described above. However, a signal of which frequency is 5 kHz has one period of 200 μsec. Thus, slot timing data is generated in synchronism with the signal of 5 kHz.

Next, the transmission system of the terminal apparatus will be described. Transmission data obtained at a terminal 41 is supplied to a modulating encoder 42 in which processing for encoding and modulation is carried out for transmission so as to generate digital I data and digital Q data for transmission. In this case, the modulating encoder 42 is supplied with the clock of 19.2 MHz as a clock which is output from the TCXO 32 as it is, and also supplied with the signal of 5 kHz generated by division with the 1/40 frequency-divider 37 as data for generating a slot timing. The digital I data and the digital Q data output from the modulating encoder 42 are supplied to digital-to-analog converters 43I and 43Q in which the data are converted into an analog I signal and an analog Q signal. The converted I signal and Q signal are supplied through low-pass filters 44I and 44Q to mixers 45I and 45Q.

Further, a frequency signal of 300 MHz output from a frequency synthesizer 38 is converted by a phase shifter 39 into two system signals of which phases are shifted from each other by 90 degrees. One of the two system frequency signals is supplied to the mixer 45I while the other of the same is supplied to the mixer 45Q, whereby the frequency signals are mixed with the I signal and the Q signal, respectively, so as to form signals falling in a 300 MHz band. Both of the signals are supplied to an adder 46 in which carried out is an orthogonal modulation to unify them into a single system signal. The frequency synthesizer 38 is a synthesizer for generating a signal of 300 MHz band based on the signal of 150 kHz generated by a frequency-division with the 1/128 frequency-divider 33.

Then, the signal modulated into the signal of 300 MHz band output from the adder 46 is supplied through a transmission amplifier 47 and a band-pass filter 48 to a mixer 49, in which the signal is added with a frequency signal of 1.9 GHz output from the frequency synthesizer 31 so as to convert the signal into a signal of a transmission frequency of 2.2 GHz band. The transmission signal frequency-converted into the transmission frequency is supplied through a transmission amplifier (variable gain amplifier) 50 and a band-pass filter 51 to the antenna sharing device 12 so that the signal is transmitted from the antenna 11 connected to the antenna sharing device 12 in a wireless fashion. A gain of the transmission amplifier 50 is controlled to thereby adjust a transmission output. The control in transmission output is carried out based on output control data received from the base station side, for example.

Further, the signal of 19.2 MHz output from the TCXO 32 is supplied to a 1/2400 frequency-divider 40 to be converted into a signal of 8 kHz, and the signal of 8 kHz is supplied to a circuit of a speech processing system (not shown). That is, in the terminal apparatus of the present example, a speech signal transmitted between it and the base station is sampled at a rate of 8 kHz (or oversampling at a rate of an integral multiple of the frequency). Thus, the 1/2400 frequency divider 40 produces a clock necessary for speech data processing circuits such as an analog-to-digital converter and a digital-to-analog converter of a speech signal or a digital signal processor (DSP) for processing for compression and expansion on speech data and so on.

Next, the encoder in the transmission system of the terminal apparatus of the arrangement and its peripheral arrangement will be described in detail with reference to FIG. 7. A convolution encoder 101 subjects a transmission data to convolution encoding. The convolution encoding is carried out with a constrained length of k=7 and a coding rate of R=⅓, for example. FIG. 8 is a diagram showing an arrangement of the convolution encoder with a constrained length of k=7 and a coding rate of R=⅓. Input data is supplied to six delay circuits 101a, 101b, . . . , 101f which are connected in series so that data of continuous 7 bits are made coincident in their timing. Ex-OR gate 101g, 101h, 101i take an exclusive-OR of a predetermined data of the seven bits and outputs of the respective Ex-OR gates 101g, 101h, 101i are converted into parallel data by a serial-to-parallel converting circuit 101j, whereby convolution-encoded data is obtained.

FIG. 7 is again described. An output of the convolution encoder 101 is supplied to a four-frame interleave buffer 102 in which data interleave is carried out over four frames (20 msec.). An output of the interleave buffer 102 is supplied to a DQPSK encoder 110 in which a DQPSK modulation is carried out. That is, a DQPSK symbol generating circuit 111 generates a corresponding symbol based on supplied data, and then the symbol is supplied to a multiplier 112 at one input terminal thereof. A delay circuit 113 delays a multiplied output of the multiplier 112 by one symbol amount and returns it to the other input terminal thereof, whereby the DQPSK modulation is carried out. The DQPSK modulated data is supplied to a multiplier 103 so that random phase shift data output from a random phase shift data generating circuit 104 is multiplied with the modulated data, whereby phase of the data is apparently changed at random.

An output from the multiplier 103 is supplied to an inverse fast Fourier transformation (IFFT) circuit 105 in which a conversion processing to a time axis is carried out on the data of the frequency axis by calculation of the inverse fast Fourier transformation, whereby data on the real time axis of the multicarrier signal of 22 subcarriers with an interval of 6.25 kHz is produced. The IFFT circuit 105 for carrying out the inverse fast Fourier transformation enables an arrangement for generating subcarriers of a second powered number relatively easily. The IFFT circuit 105 employed in the present example is capable of generating $2^5$ subcarriers, i.e., 32 subcarriers and outputs data modulated into continuous 22 subcarriers of the generated subcarriers. The modulation rate of transmission data dealt by the FFT circuit 105 of the present example is set to 200 kHz. A signal of a modulation rate of 200 kHz is converted into thirty-two multicarriers to produce multicarrier signals with an interval of 6.25 kHz, which numeral derives from calculation of 200 kHz÷32=6.25 kHz.

Figures 9A, 9B:
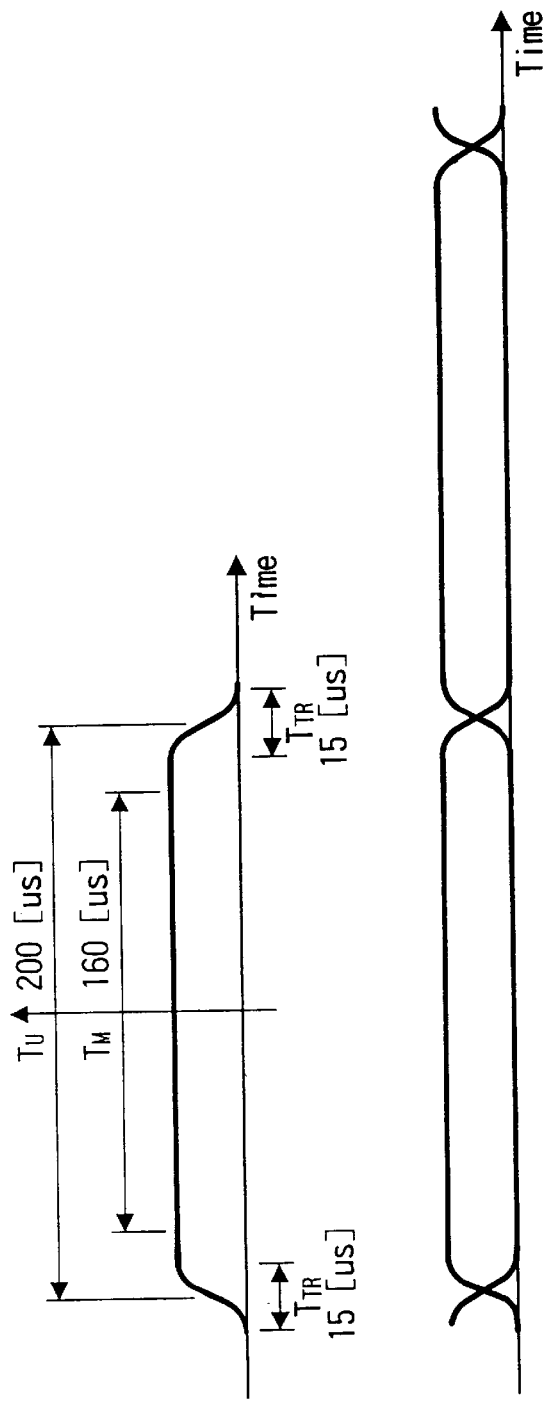
FIGS. 9A and 9B are diagrams showing examples of waveforms of a windowing data according to the embodiment.

The multicarrier data transformed into data of the real time by the inverse fast Fourier transformation is supplied to a multiplier 107 in which the data is multiplied with a time waveform output from a windowing data generating circuit 106. The time waveform is a waveform having one waveform length $T_u$, or about 200 μsec. (that is, one time slot period) as shown in FIG. 9A, for example, on the transmission side. However, the waveform is arranged to have its both end portions $T_{TR}$ (about 15 μsec.) changing gently in its waveform level. Hence, the neighboring time waveforms are arranged to overlap partly on each other as shown at FIG. 9B when the time waveform is utilized for multiplication.

FIG. 7 is again described. The signal multiplied with the time waveform by the multiplier 107 is supplied through a burst buffer 108 to an adder 109. The adder 109 adds control data output from a control data selector 121 to the signal at a predetermined position. The control data utilized for addition is control data indicating control of transmission output. Based on a result of determination over the condition of the received signal at a terminal 122, the selector 121 sets the control data.

In this case, the selector 121 is connected with three control data memories 123, 124, 125 (actually, these memories may be provided by dividing an area of one memory into three portions). Control data for decreasing a transmission output (−1 data) is stored in the memory 123, control data for keeping the transmission output in an unchanged state (±0 data) is stored in the memory 124, and control data for increasing the transmission output (+1 data) is stored in the memory 125, respectively. The control data stored in this case is data equivalent to data when the corresponding control data is subjected to the modulation processing for transmission in the encoder up to the multiplier 107.

Figure 10:
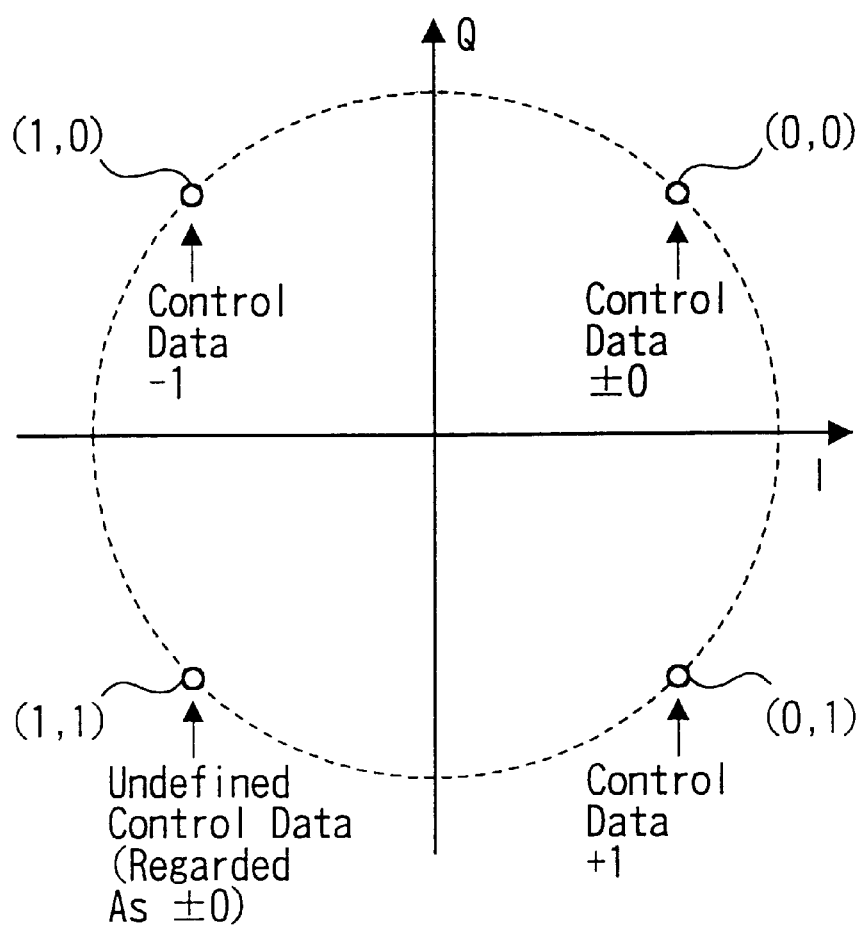
FIG. 10 is a phase characteristic graph showing an example of a transmission data according to the embodiment.

More concretely, the transmission data is a phase-modulated data changing on a plane formed by the I-axis and the Q-axis orthogonal to each other, i.e., the data changing along a circle on a plane shown in FIG. 10. Data (I, Q) at a position of (0, 0) is set to ±0 data, that at a position of (1, 0) behind from the position by 90 degrees is set to −1 data and that at a position of (0, 1) ahead of the position of ±0 data by 90 degrees is set to +1 data. Control data for the transmission output corresponding to a position of (1, 1) is undefined so that when the reception side discriminates the data of the position, the data is regarded as ±0 data to keep the transmission output unchanged. The signal phase shown in FIG. 10 is a phase before being modulated into multicarrier signals. Actually, the data of the signal phase is modulated into multicarrier signal and data generated by multiplied with a time waveform are stored in respective memories 123, 124, 125.

Transmission data added with the control data by the adder 109 is supplied to a digital-to-analog converter 43 (which corresponds to the digital-to-analog converters 43I, 43Q shown in FIG. 6) in which the transmission data is converted into an analog signal using a clock of 200 kHz for conversion.

Next, the decoder and the peripheral arrangement thereof of the reception system of the terminal apparatus of the present example will be described in detail with reference to FIG. 11. Digital data resulting from conversion by an analog-to-digital converter 20 (corresponding to the analog-to-digital converters 20I, 20Q in FIG. 6) using a clock of 200 kHz, is supplied through a burst buffer 131 to a multiplier 132, in which the digital data is multiplied with a time waveform output from an inverse windowing data generating circuit 133. The time waveform utilized for multiplication upon reception is a time waveform with a shape shown in FIG. 7A. This time waveform is arranged to have a length, $T_M$, i.e., 160 μsec. which is shorter than the length of the same upon transmission.

The reception data multiplied with the time waveform is supplied to a FFT circuit 134 in which conversion between a frequency axis and a timebase is carried out by the fast Fourier transformation processing, whereby the transmitted data modulated into 22 subcarriers with an interval of 6.25 kHz and arranged on the time base are separated into information component which each carrier has. The conversion processing in this case is carried out by a circuit capable of processing subcarriers of $2^5$, i.e., thirty-two subcarriers, similarly to the case in which conversion processing is carried out by the IFFT circuit in the transmission system. Data modulated into continuous twenty-two subcarriers of them are converted and output therefrom. The modulation rate of transmission data dealt by the FFT circuit 134 of the present example is set to 200 kHz. Since the circuit is capable of processing thirty-two multicarriers, conversion processing can be carried out on multicarriers with an interval of 6.25 kHz, which numeral derives from calculation of 200 kHz÷32 =6.25 kHz.

The reception data which has been subjected to the fast Fourier transformation in the FFT circuit 134 is supplied to a multiplier 135, in which the reception data is multiplied with inverse random phase shift data (this data is data changing in synchronism with random phase shift data on the transmission side) output from an inverse random phase shift data generating circuit 136, whereby the data is restored to have its original phase.

The data restored to have its original phase is supplied to a differential demodulation circuit 137 in which the data is subjected to differential demodulation. The differentially demodulated data is supplied to a four-frame de-interleave buffer 138 in which data interleaved over four frames upon transmission is restored to have its original data order. The deinterleaved data is supplied to a Viterbi decoder 139 in which the data is Viterbi-decoded. The Viterbi-decoded data is supplied as decoded reception data to a reception data processing circuit (not shown) placed in the later stage.

Figure 7:
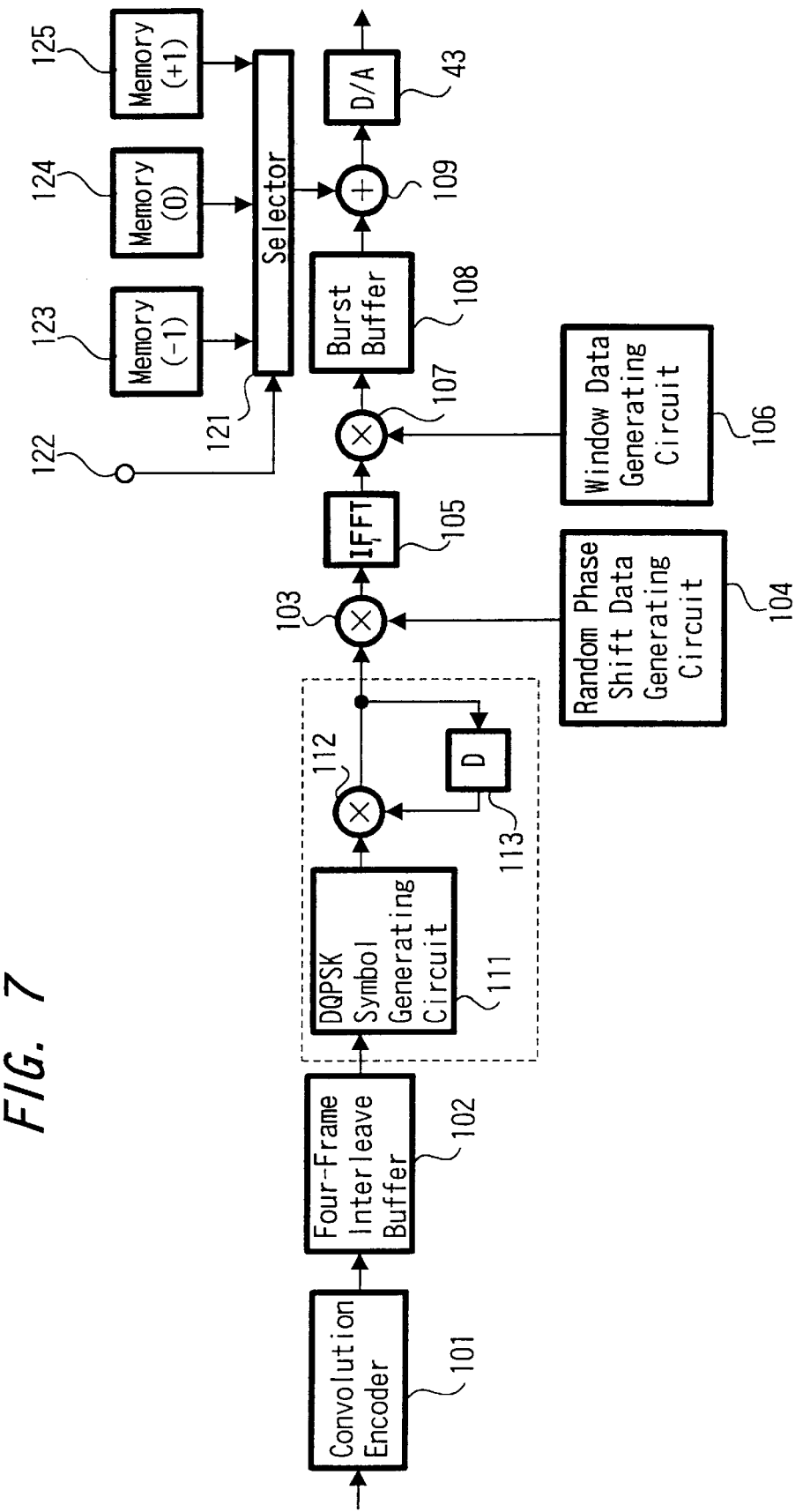
FIG. 7 is a block diagram showing an arrangement of an encoder of the terminal apparatus according to the embodiment.
Figure 8:
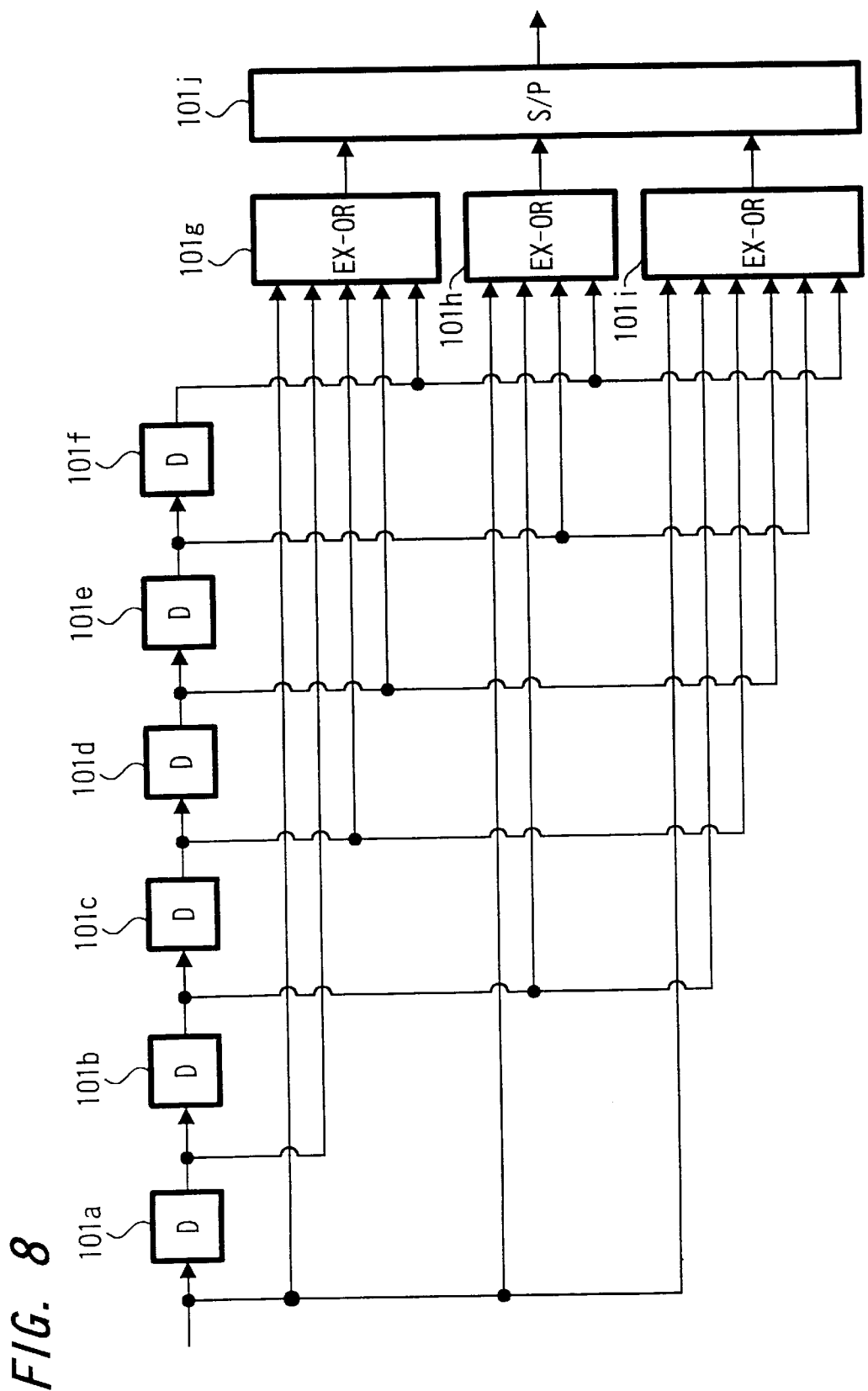
FIG. 8 is a block diagram showing an arrangement of a convolutional encoder of the terminal apparatus according to the embodiment.
Figure 11:
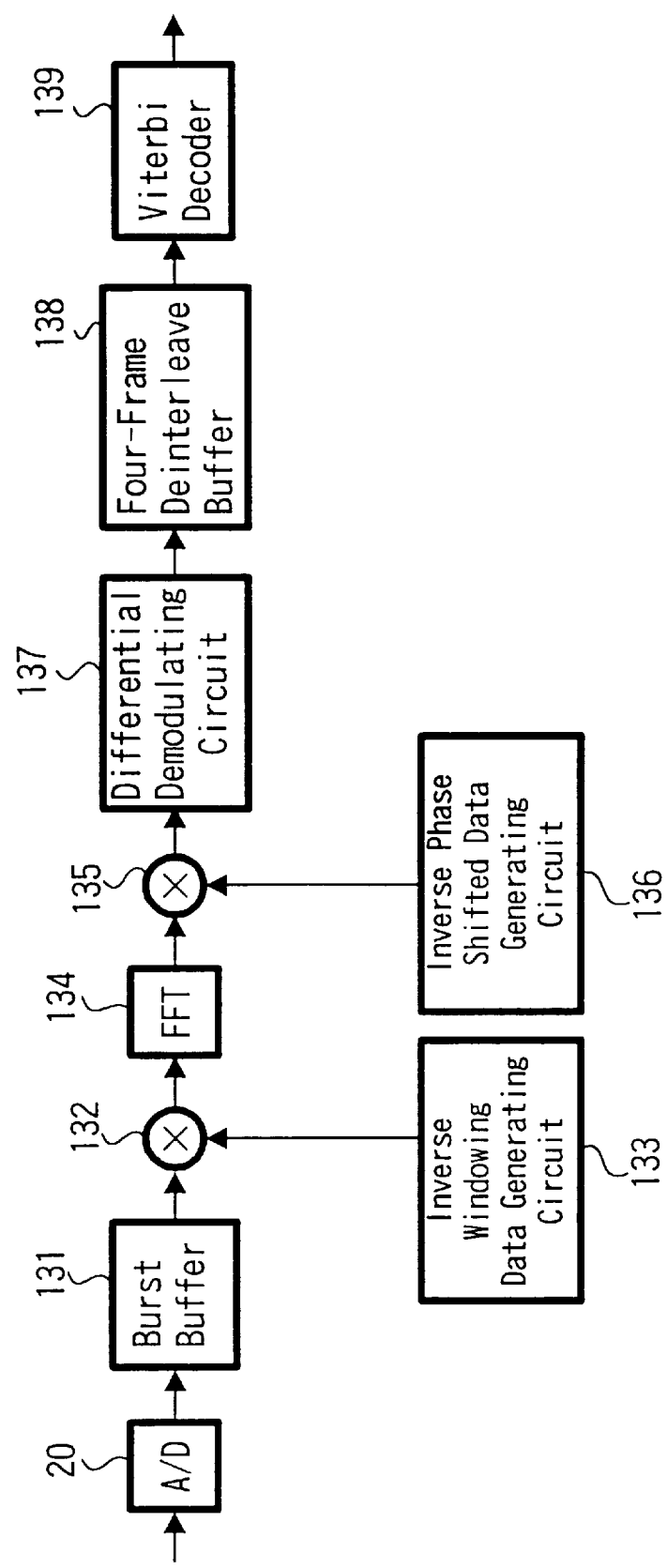
FIG. 11 is a block diagram showing an arrangement of a decoder of the terminal apparatus according to the embodiment.
Figure 12:
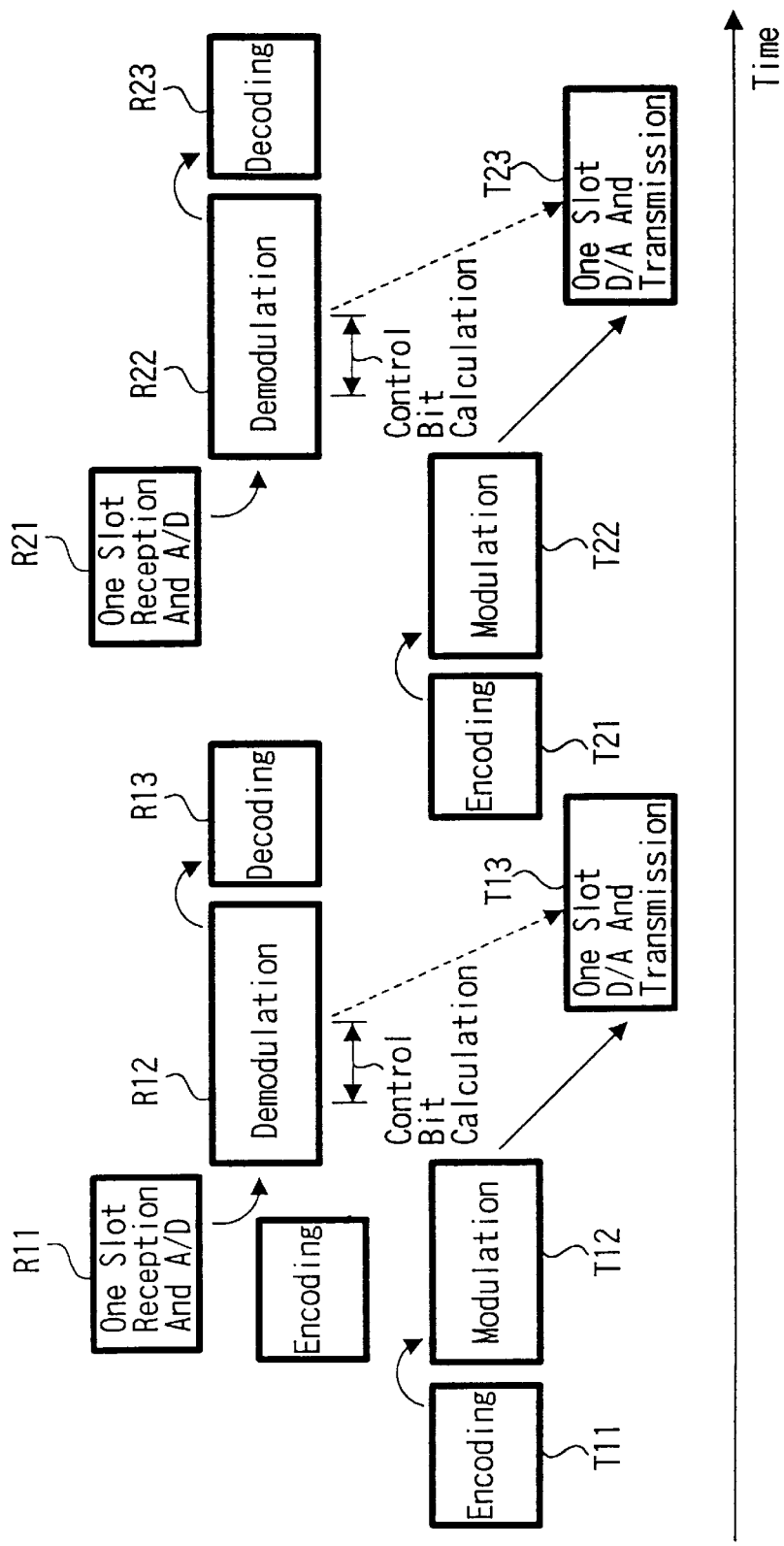
FIG. 12 is a block diagram representing a sequence of the processing according to the embodiment as shown in FIGS. 6, 7, and 11.

FIG. 12 is a block diagram representing a sequence of the processings described so far in relation to the embodiment of FIGS. 6, 7, and 11. Initially, data of one time slot is received at timing R11 in the reception system, and simultaneously with the reception, the received data is converted into digital data by the analog-to-digital converter 20 and then stored in the burst buffer 131. The stored reception data is subjected to demodulation processings such as multiplication with the time waveform, the fast Fourier transform, multiplication with the inverse random phase shift data, differential demodulation, Viterbi demodulation and so on at the next timing R12. Thereafter, decoding is carried out by data processing at the next timing R13.

Then, from timing R21 which is six time slots after timing R11, to timing R23, a processing the same as that of timing R11 to R13 is carried out. Thereafter, the same processing is repeated.

In the transmission system, transmission is carried out at a timing shifted by three time slots with respect to the timing of reception. That is, the transmission data is encoded at predetermined timing T11, the encoded data is subjected to a modulation processing by which the data is converted into transmission data of one burst amount at the next timing T12, and the data is once stored in the burst buffer 108 of the transmission system. Then, at timing T13 behind three time slots from the reception timing R11, the transmission data stored in the burst buffer 108 is converted by the digital-to-analog converter 43 and then subjected to transmission processing and transmitted from the antenna 11. Then, from timing T21, which is six time slots after timing Y11, to timing T23 a processing the same as that of timing T11 to T13 is carried out. Thereafter, the same processing is repeated.

In this way, reception processing and transmission processing are carried out intermittently in a time sharing manner. In the present example, control data (control bit) of the transmission output to be added to transmission data is, i.e., the control data of the transmission output upon transmission as described with reference to FIG. 7 is, added by the adder 109 at the last timing when the encode processing is completed for transmission. Therefore, the state of the reception data can be swiftly reflected upon the control data to be transmitted. That is, for example, reception state of the burst signal received at timing R11 is detected at a midst of demodulation at timing R12, and the control state of the transmission output to be notified to the opponent of communication (base station) is determined (i.e., FIG. 12 shows a processing at a timing indicating control bit calculation). When the control bit is calculated, the result of calculation is sent from the terminal 122 to the selector 121, in which the calculation result is added with control data corresponding to transmission data stored in the burst buffer 108, and a burst signal to be transmitted at timing T13 is added with control data of transmission output based on the last received data indicative of the state.

The opponent carrying out communication (base station) determines the control data transmitted at timing T13 so that the opponent controls the transmission output into the corresponding state when the burst signal is transmitted from the base station at the next timing R21. Consequently, the burst signal to be transmitted next is controlled in its transmission output on the basis of the reception state of the burst signal which has been transmitted in the preceding cycle. Thus, the transmission output is positively controlled at every one cycle when the burst signal is transmitted, and hence it is possible to substantially uniform transmission outputs of transmission signals transmitted through a plurality of paths between the terminal apparatus and one base station at the same time.

If it is not carried out the processing that, as in the present example, the control data of the transmission output is prepared in the memory in advance to carry out adding processing, then the following consequence will happen in the example of FIG. 12, for example. That is, a result received at timing R11 is determined in the process of demodulation at timing R12, thereafter the control data is encoded at timing T21 and modulated at timing T22, and the control data based on the reception result at timing R11 is transmitted in response to the burst signal transmitted at timing T23. Thus, it is impossible to control the transmission output at every cycle. While description has been made on a case in which the terminal apparatus side generates data useful for controlling the transmission output from the base station, it is needless to say that the base station side may also generate data useful for controlling the transmission output from the terminal apparatus.

Arrangements of a base station communicating with the terminal apparatus and an exchange unifying the base station will be described with reference to FIGS. 13 to 23. An arrangement of the base station for transmission and reception is fundamentally similar to that of the terminal apparatus except in an arrangement thereof for multiple access in which a plurality of terminal apparatus simultaneously access the base station. In this embodiment, all the processings for communication are not carried out by only the base station. The exchange also carries out a part of the above processing.

Figure 13:
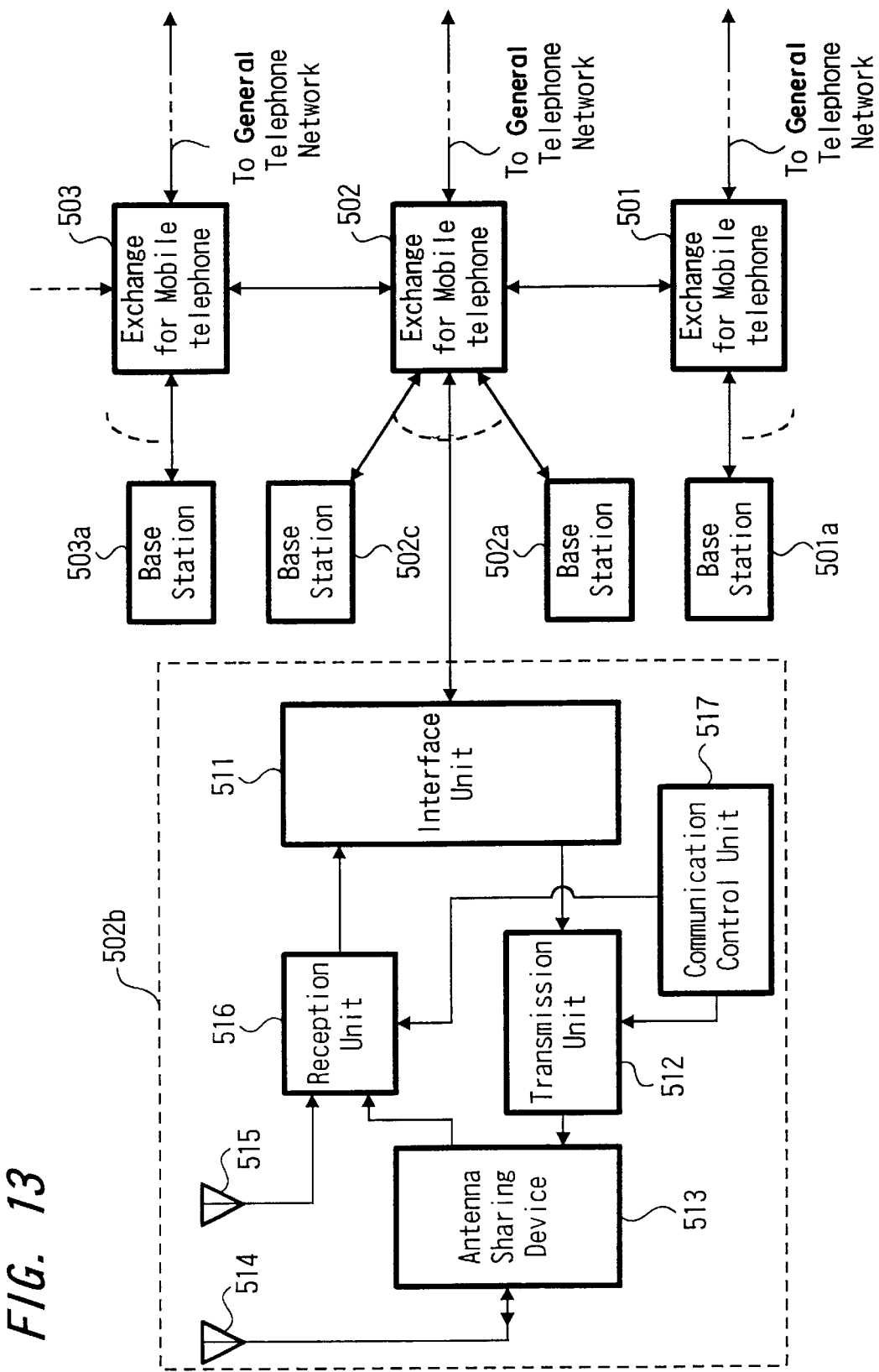
FIG. 13 is a block diagram showing a system arrangement of a base station and an exchange according to the embodiment of the present invention.

FIG. 13 shows a total system arrangement of the base station and the exchange. In a radio telephone system according to this embodiment, a plurality of exchanges for mobile telephones 501, 502, 503, . . . are disposed at predetermined areas. Each of the exchanges for mobile telephones 501, 502, 503, . . . is connected to a ground dedicated circuit or the like. Each of the exchanges for mobile telephones 501, 502, 503, . . . is connected a plurality of base stations. For example, the exchange 501 is connected to base stations 501a, 501b, . . . . The exchange 502 is connected to base stations 502a, 502b, . . . . Each of the exchanges for mobile telephones 501, 502, 503, . . . carries out the channel coding and decoding processings of data for communication with a terminal apparatus, and the base station carries out the modulation processing and the demodulation processing.

Specifically, the base station 502b has an interface unit 511 for communicating with the exchange 502. Data subjected by the exchange 502 to the channel coding is supplied through the interface unit 511 to a transmission unit 512. The transmission unit 512 subjects the data to the transmission modulation processing and further subjects the modulated signal to a high-frequency carrier transmission processing, thereby converting the signal into the transmission signal. The transmission unit 512 supplies the transmission signal through an antenna sharing device 513 to an antenna 514 to transmit the transmission signal by wireless therefrom. A signal received by the antennas 514, 515 (two antennas are used to carry out diversity reception) is supplied to a reception unit 516. The reception unit 516 subjects the signal to the high-frequency carrier reception processing to convert it into an intermediate-frequency signal, and further demodulates the intermediate-frequency signal to obtain a soft decision data. The reception unit 516 supplies the soft decision data through the interface unit 511 to the exchange 502. The exchange 502 carries out the channel decoding processing for decoding a reception symbol. The processings of the transmission unit 512 and the reception unit 516 in the base station are carried out under the control of a communication control unit 517. Each of the exchange, 501, 502, 503, . . . is connected also to a general wire telephone network, which allows communication with a general telephone network and a terminal apparatus.

Figure 14:
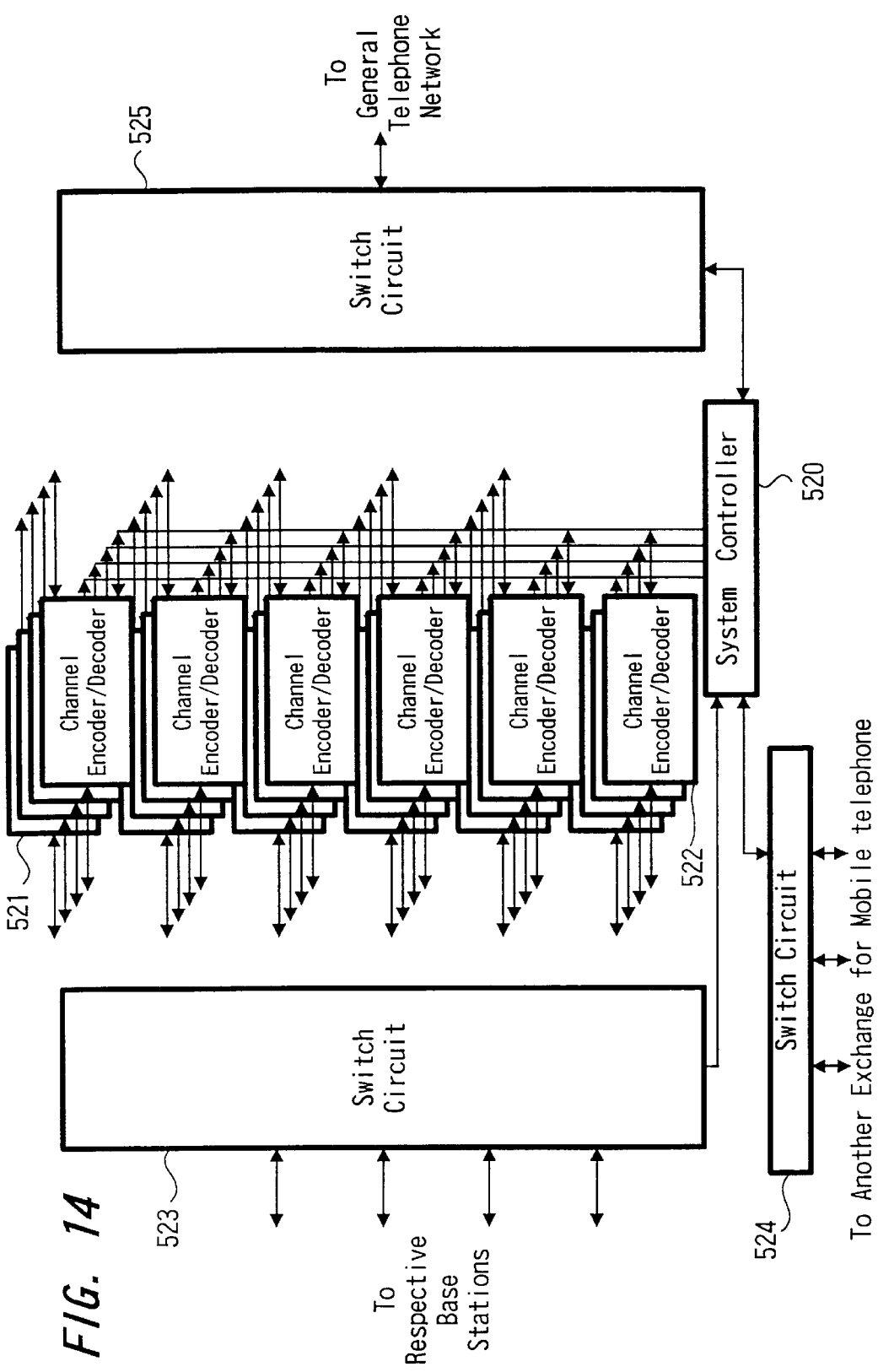
FIG. 14 is a block diagram showing an arrangement of the exchange according to the embodiment of the present invention.

FIG. 14 shows an arrangement of each of the exchanges 501, 502, 503, . . . . Each of the exchanges 501, 502, 503, . . . has channel encoder/decoder for carrying out the channel coding and the channel decoding under the control of a system controller 520 whose number is as much as the number of circuits the exchange can simultaneously process. Each of the exchanges 501, 502, 503, . . . has control channel encoder/decoder for carrying out channel coding for control channel and channel decoding for control channel whose number is as much as the number it requires. Each of the channel encoder/decoders 521, 522 is connected through a switching circuit 523 to each of the base stations directly connected to this exchange, and also connected through a switching circuit 524 to another exchange for a mobile telephone. Moreover, each of the channel encoder/decoders 521, 522 is connected through a switching circuit 525 to a general telephone network.

Figure 15:
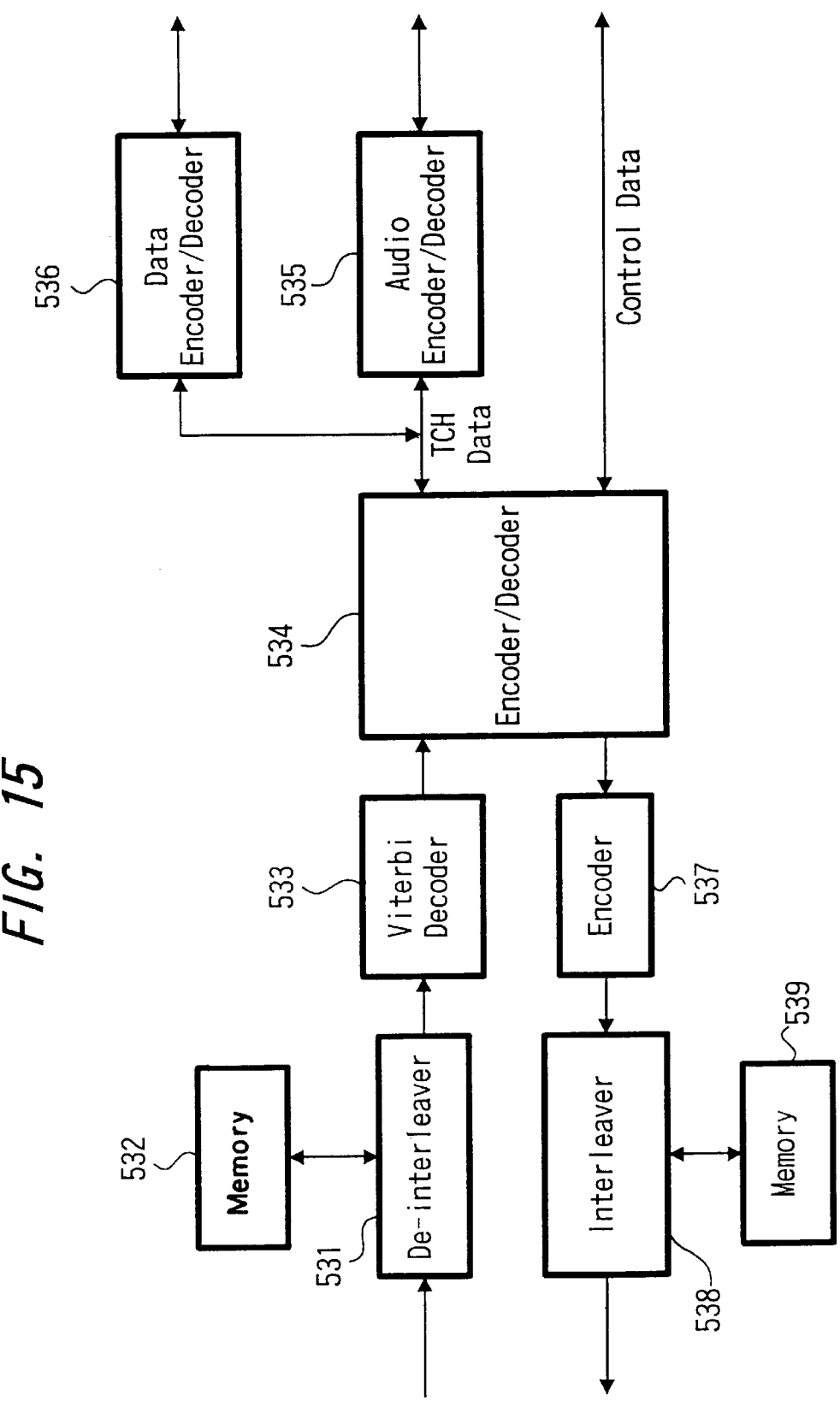
FIG. 15 is a block diagram showing a channel encoder/decoder of the exchange according to the embodiment of the present invention.

FIG. 15 shows a specific arrangement of each of the channel encoder/decoders provided in the exchange. Data supplied from the base station (i.e., the soft decision data obtained by receiving a signal from the terminal apparatus to demodulate it) is supplied to a deinterleaver 531. The deinterleaver 531 once stores the data in a memory 532 connected thereto and carries out the deinterleaving processing for returning a data arrangement to an original arrangement. The deinterleaver 531 supplies the deinterleaved reception symbol to a viterbi decoder 533. The Viterbi decoder 533 subjects the deinterleaved reception symbol to a Viterbi decoding and supplies the viterbi-decoded reception data to an encoder/decoder 534. The encoder/decoder 534 carries out a decoding processing for separating an audio data, a control data and so on from the supplied data of the transmission data arrangement and supplies a TCH data which is a communication data such as an audio data or the like to an audio encoder/decoder 535 and the data encoder/decoder 536. The audio encoder/decoder 535 carries out the decoding processing for an audio data and supplies the decoded data to an opponent (another exchange, a general telephone network or the like). If the TCH data is formed of various data other than the audio data, the data encoder/decoder 536 carries out a decoding processing for data and transmits the decoded data to an opponent. Various control data is transmitted to a communication center (not shown) unifying the radio telephone system.

When the data is transmitted to the terminal apparatus side, the data subjected to the corresponding encoding by the audio encoder/decoder 535 or the data encoder/decoder 536 is supplied to an encoder/decoder 534. The encoder/decoder 534 carries out the channel encoding processing of arranging the supplied data together with the control data in the transmission data arrangement and then supplies the channel-encoded data to an encoder 537. The encoder 537 encodes the data to the transmission data and supplies the encoded data to an interleaver 538. The interleaver 538 interleaves the data arranged in the period of four frames. At this time, the interleaver 538 carries out this processing with once storing the data in a memory 539 connected to the interleaver 538. Then, the interleaved data is transmitted to the base station.

Figure 16:
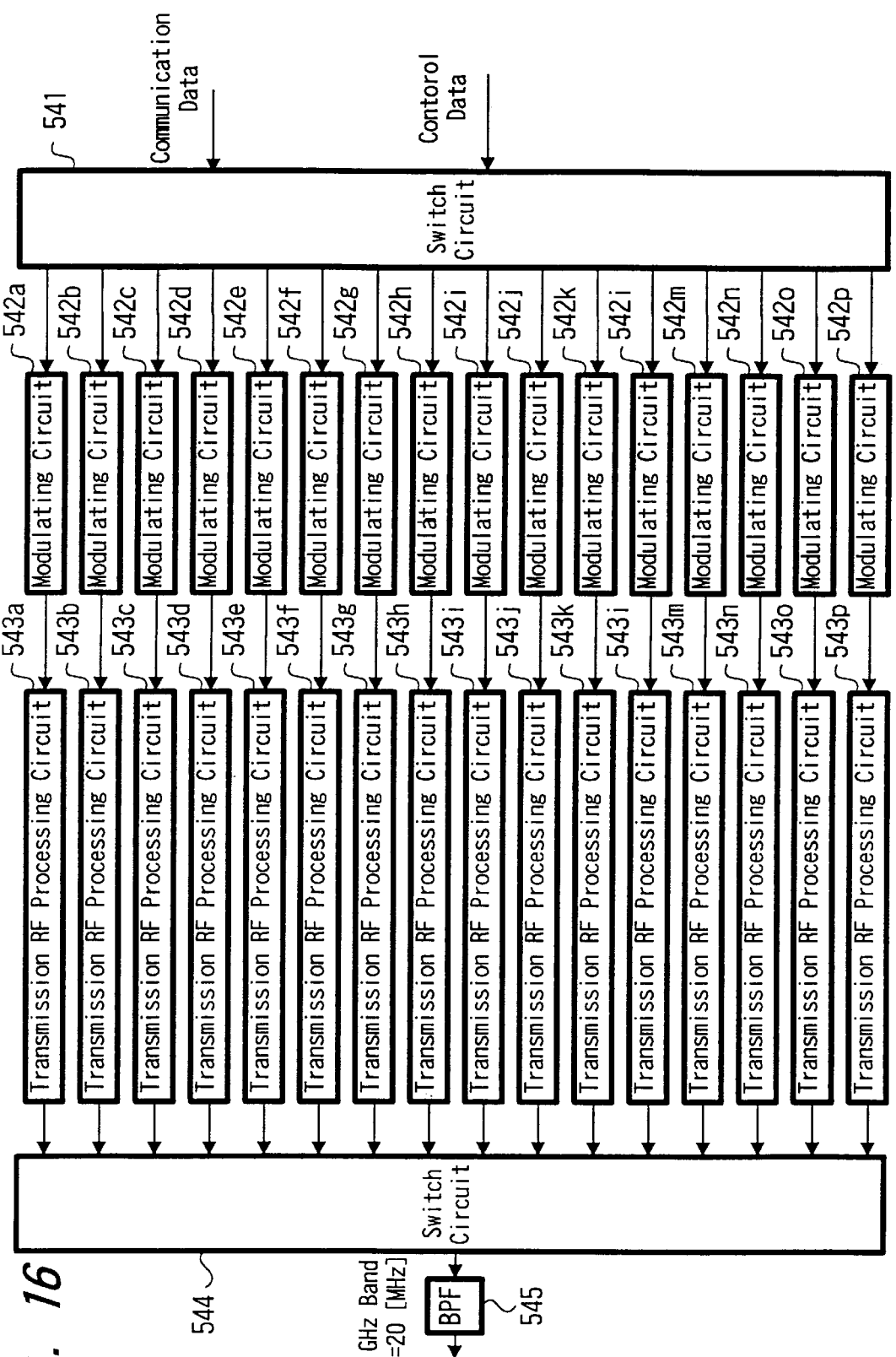
FIG. 16 is a block diagram showing a transmission processing of the base station according to the embodiment of the present invention.

An arrangement of each of the base station for transmitting data to a terminal apparatus will be described with reference to FIG. 16. In this embodiment, the processings for 128 band slots can be carried out simultaneously. Communication data such as an audio data and communication control data are transmitted as the communication data transmitted from the exchange. The communication control data includes a data of a time slot allocation, a power control data and so on. These data are supplied through a switching circuit 541 to any of sixteen modulating circuits 542a to 542p. In this case, the sixteen modulating circuits 542a to 542p processes 128 band slots, eight band slots are processed per one modulating circuit. A specific arrangement of each of the modulating circuit 542a to 542p will be described later on.

The data modulated by the modulating circuits 542a to 542p for transmission are supplied to transmission high-frequency carrier processing circuits 543a to 543p and thereby subjected to transmission high-frequency carrier processing, respectively. A specific arrangement of each of the transmission high-frequency carrier processing circuits 543a to 543p will be described later on. The transmission signals obtained by the transmission processings of the transmission high-frequency carrier processing circuits 543a to 543p are synthesized by a synthesizing circuit 544 and then supplied to a band-pass filter (BPF) 545. The band-pass filter 545 removes a signal outside of a transmission band therefrom and then supplies the processed signal to a transmission antenna for radio transmission.

Figure 17:
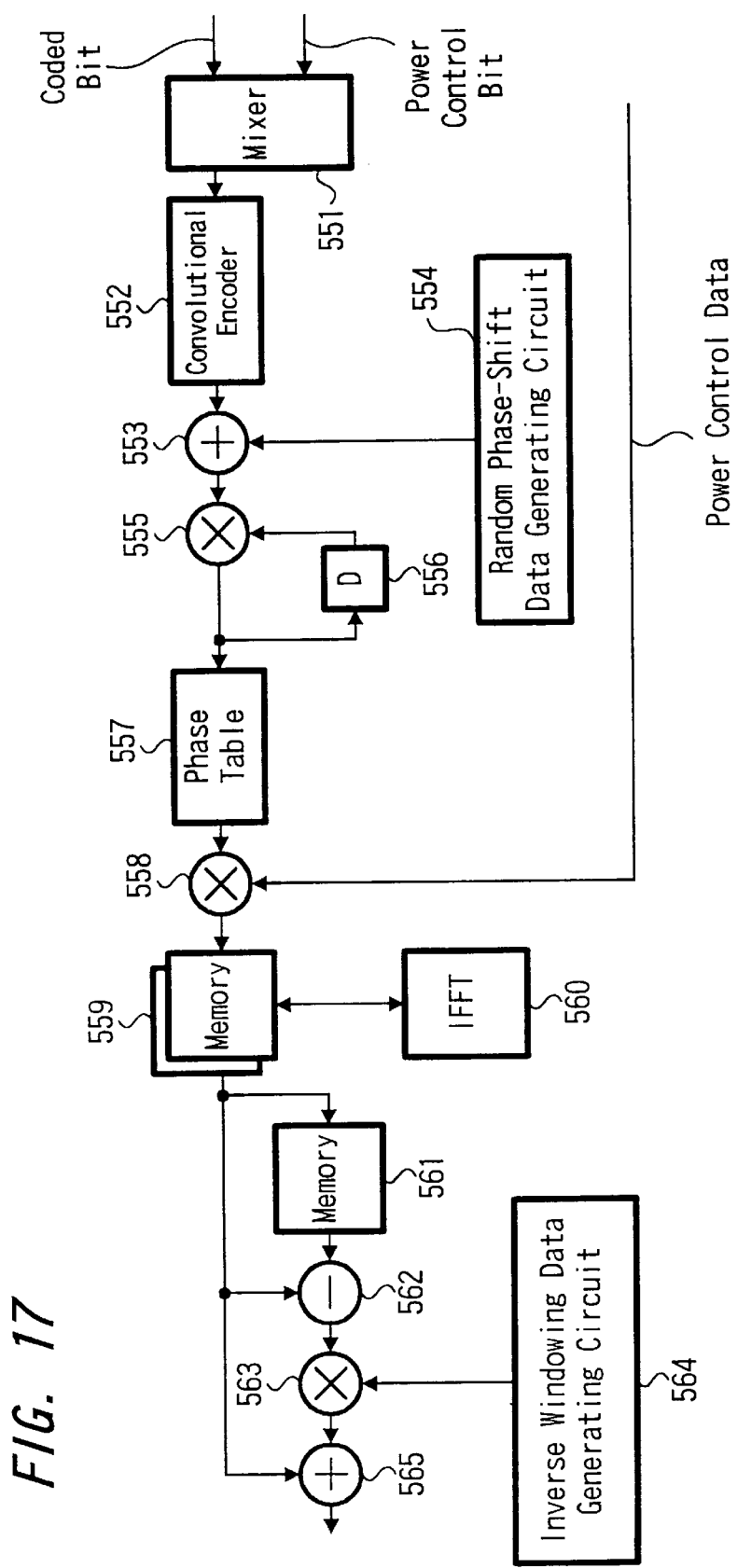
FIG. 17 is a block diagram showing a modulating processing of the base station according to the embodiment of the present invention.

A specific arrangement of each of the modulating circuits 542a to 542p of the base station will be described with reference to FIG. 17. Coded bits and power control bits from the exchange are mixed by a mixer 551 to data of one system and then supplied to a convolutional encoding circuit 552. The convolutional encoding circuit 552 subjects the data of one system to the convolutional encoding and then supplies the convolutional-encoded data to a mixer 553. The mixer 553 mixes the data with a random phase shift data output from the random phase shift data generating circuit 554 to obtain a data whose phase is seemingly shifted at random. The mixer 553 supplies such data to a multiplier 555. The multiplier 555 multiplies the supplied data with a signal obtained by delaying an output from the multiplier 555 by one symbol amount by a delay circuit 556, thereby obtaining a DQPSK-modulated data. The mixer 555 supplies the modulated data to a phase table 557. Based on the DQPSK-modulated data, an output from the phase table 557 is selected and supplied to a multiplier 558. The multiplier 558 multiplies the output from the phase table 557 with a power control data to obtain data of a corresponding power.

The multiplier 558 supplies the data of the corresponding power to a memory 559. An IFFT circuit 560 connected to the memory 559 carries out an inverse fast Fourier transform to carry out a processing of converting a frequency axis into a time axis to obtain a multicarrier signal. The converted multicarrier signal is supplied through a buffer memory 561 to a subtracter 562. The subtracter 562 calculates difference between this multicarrier signal and a multicarrier signal supplied directly thereto from the memory 559, and supplies a difference data to a multiplier 563. The multiplier 563 multiplies this difference data with a windowing data output from a windowing data generating circuit 564 and supplies a multiplication output to an adder 565. The adder 565 adds the multiplication data with an output directly from the memory 559 and outputs the addition output as a modulation signal.

Figure 18:
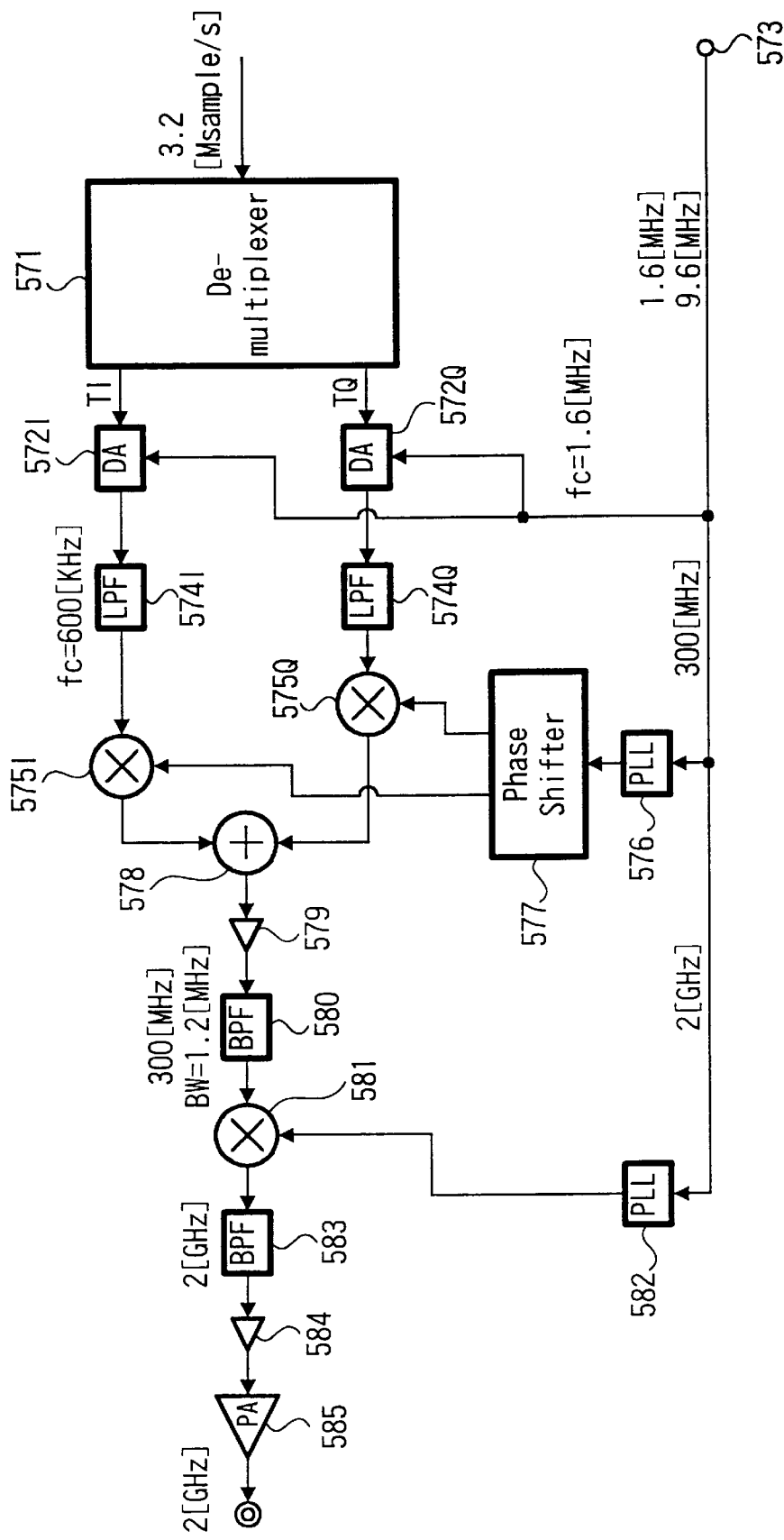
FIG. 18 is a block diagram showing a transmission processing of a high-frequency carrier system of the base station according to the embodiment of the present invention.
Figure 19:
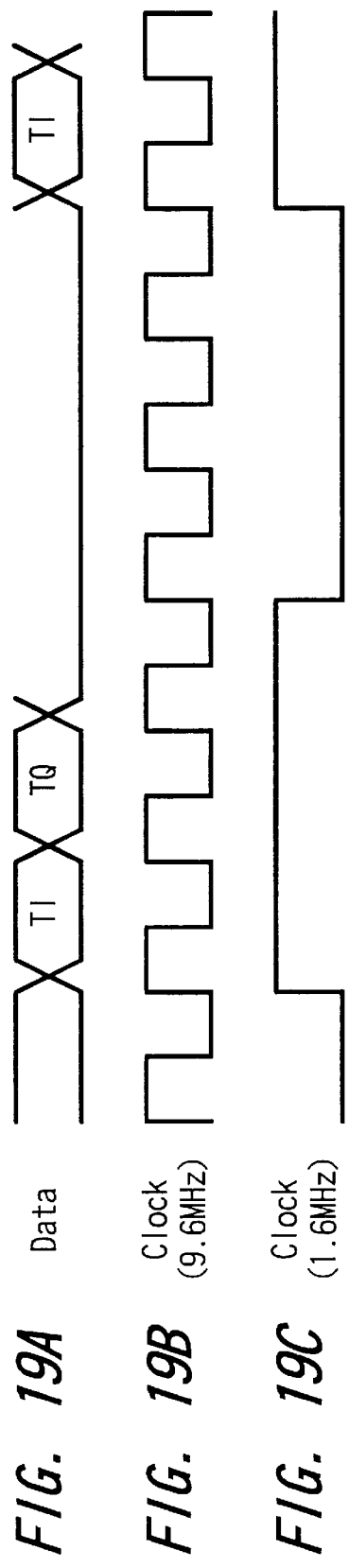
FIGS. 19A to 19C are timing charts showing timings of the transmission processing according to the embodiment of the present invention.

A specific arrangement of each of the transmission high-frequency carrier processing circuits 543a to 543p for subjecting the modulation signal thus obtained to the transmission processing will be described with reference to FIG. 18. The supplied modulation signal (data of 3.2 M sample/sec.) is separated by a demultiplexer 571 into a transmission I data TI and a transmission Q data TQ. The respective transmission I and Q data TI, TQ are supplied to digital/analog converters 572I and 572Q and thereby converted into analog signals. The D/A converters 572I and 572Q supplies the respective analog signals through low-pass filters 574I and 574Q to multipliers 575I and 575Q. A clock of 1.6 MHz obtained at a terminal 573 is used as conversion clocks used in the D/A converters 572I and 572Q. FIGS. 19A to 19C shows a relationship between the modulation signal including the data TI, TQ and the clocks of 9.6 MHz and 1.6 MHz obtained at the terminal 573.

The multipliers 575I and 575Q multiply the modulation signal including the data TI and TQ with signals obtained by shifting a phase of a signal having a frequency of 300 MHz generated by a PLL circuit 576 based on the clock obtained at the terminal 573 by 90° and supply them through a buffer amplifier 579 to a band-pass filter 580. The band-pass filter 580 passes a signal having a width of 1.2 MHz in a band of 300 MHz and supplies its output to a mixer 581. The mixer 581 multiplies the output with a signal in a band of 2 GHz generated by a PLL circuit 582 based on the clock obtained at the terminal 573 to obtain a transmission signal in a band of 2 GHz. The mixer 581 supplies the transmission signal through a band-pass filter 583 and a buffer amplifier 584 to a power amplifier 585. The power amplifier 585 amplifies the transmission signal for transmission and supplies the amplified signal to the synthesizing circuit 544 (see FIG. 16).

Figure 20:
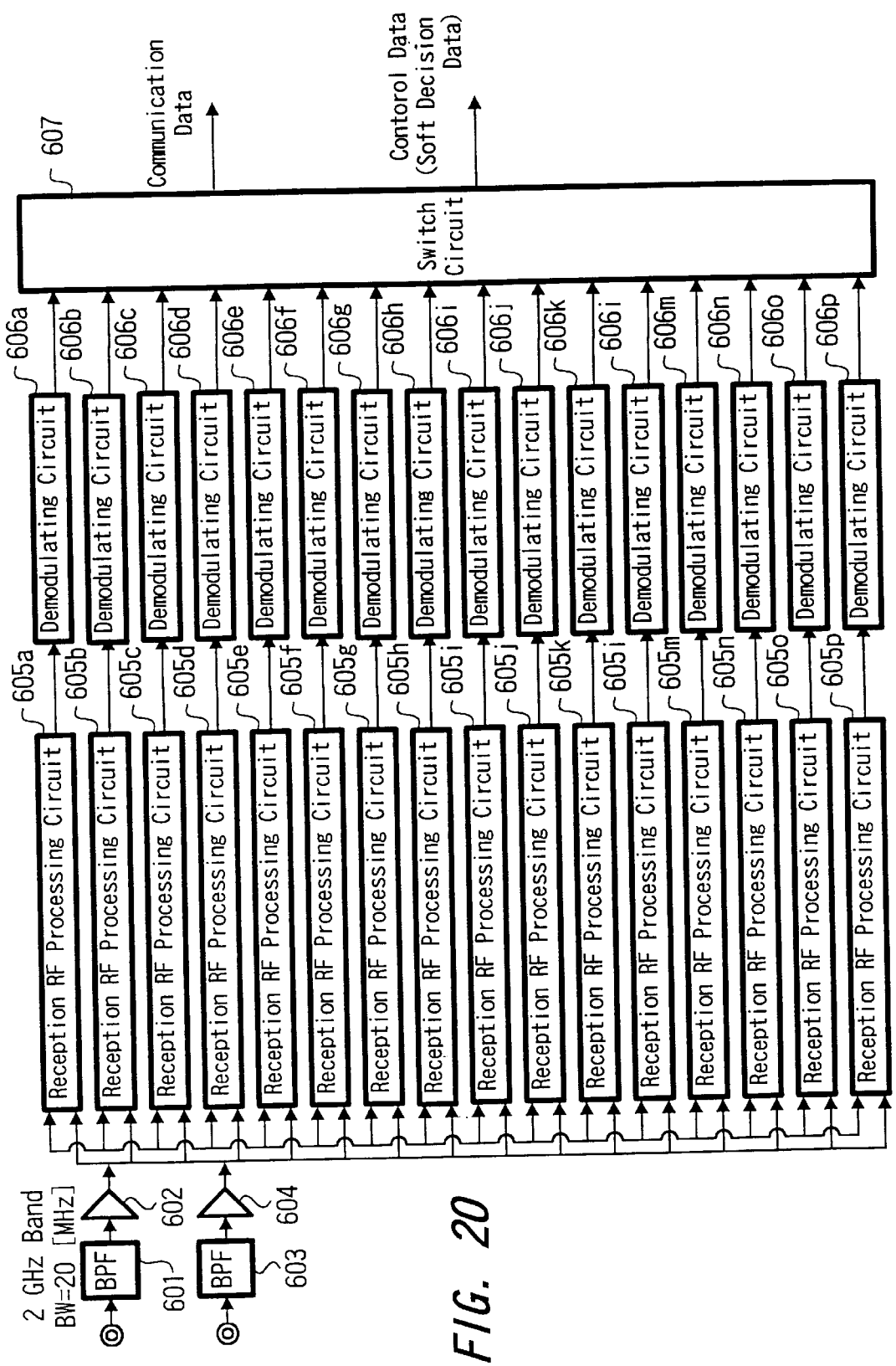
FIG. 20 is a block diagram showing a reception processing of the base station according to the embodiment of the present invention.

An arrangement for receiving a signal transmitted from the terminal apparatus to the base station will be described with reference to FIG. 20. As shown in FIG. 13 the base station according to this embodiment has two antennas 514, 515 for reception. A signal from the antenna 514 is supplied to a band-pass filter 601 and a low-noise amplifier 602 to sixteen reception high-frequency carrier processing circuits 605a to 605p. Each of the reception high-frequency carrier processing circuits 605a to 605p carries out the reception processing of eight band slots allocated at an interval of 1.2 GHz. A signal from the antenna 515 is also supplied through a band-pass filter 603 and a low-noise amplifier 604 to sixteen reception high-frequency carrier processing circuits 605a to 605p. Each of the reception high-frequency carrier processing circuits 605a to 605p carries out the reception processing of eight band slots allocated at an interval of 1.2 GHz. A specific arrangement of each of the reception high-frequency carrier processing circuits 605a to 605p will be described later on.

Signals received by the reception high-frequency carrier processing circuits 605a to 605p are supplied to demodulating circuits 606a to 606p. The demodulating circuits 606a to 606p demodulate the signals to obtain the soft decision data. A specific arrangement of each of the demodulating circuits 606a to 606p will be described later on. The soft decision data output from the demodulating circuits 606a to 606p are transmitted through a switching circuit 607 to the exchange connected to this base station. In this case, the communication control data as well as the soft decision data of the communication data such as the audio data or the like is transmitted to the exchange. The communication control data includes data about a time slot allocation and a data about a reception power.

Figure 21:
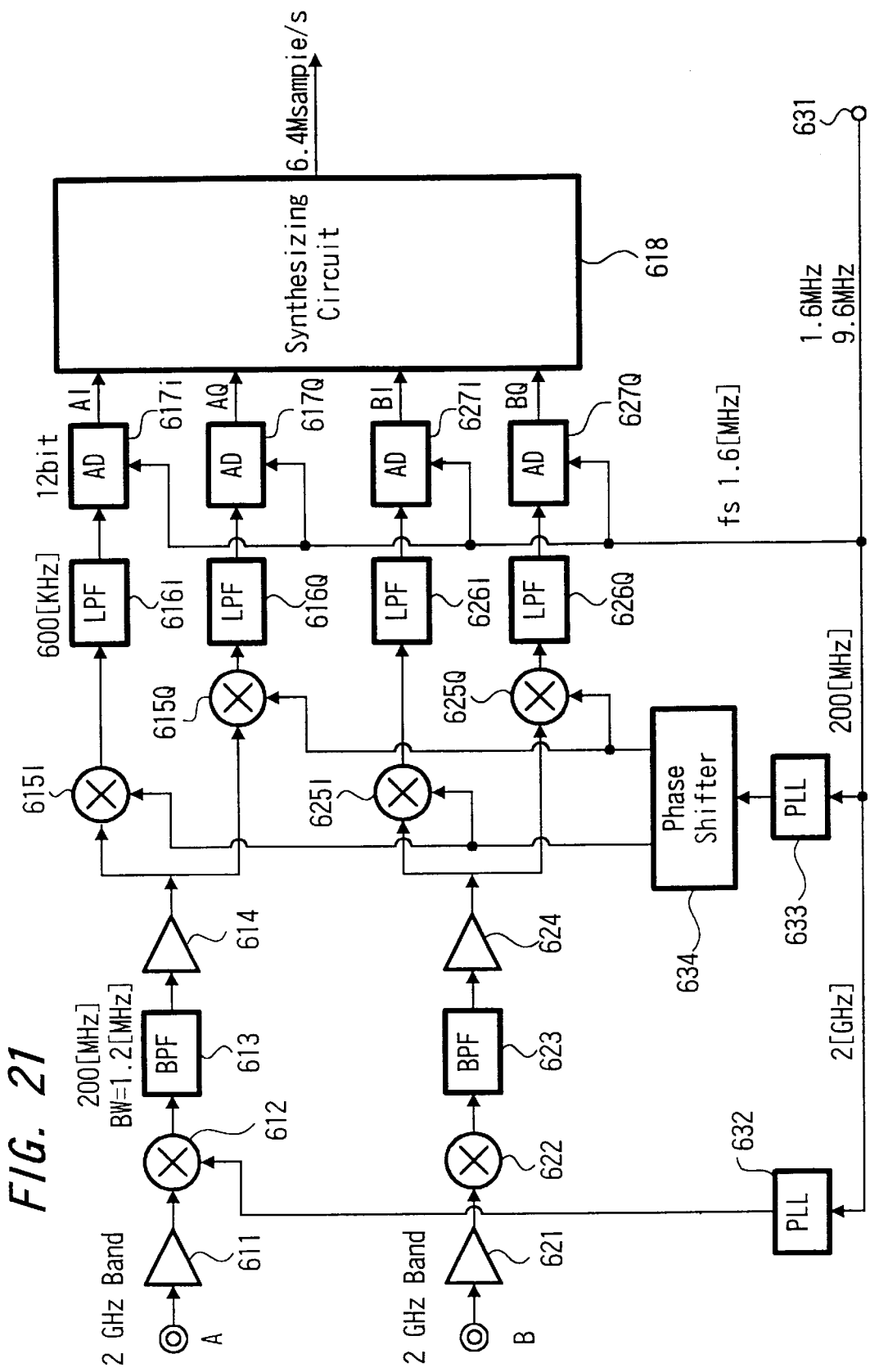
FIG. 21 is a block diagram showing a reception processing of a high-frequency carrier system of the base station according to the embodiment of the present invention.

An arrangement of each of the reception high-frequency carrier processing circuits 605a to 605p will be described with reference to FIG. 21. An output in a band of 2 GHz of a reception signal from one antenna is supplied through a buffer amplifier 611 to a mixer 612. The mixer 612 mixes the output signal with a frequency signal generated by a PLL circuit 632 based on the clock obtained at a terminal 631 to obtain an intermediate frequency signal. The mixer 612 supplies the intermediate frequency signal through a band-pass filter 613 and a buffer amplifier 614 to multipliers 615I and 615Q. The multipliers 615I and 615Q multiplies the supplied intermediate-frequency signals with one and the other outputs from a phase shifter 634. The phase shifter 634 is supplied with a signal of 200 MHz generated by a PLL circuit 633 based on the clock obtained at the terminal 631 and generates the one and the other signals obtained from the signal of 200 MHz and having phases shifted from each other by 90°. Since the multipliers 615I and 615Q multiplies the supplied intermediate-frequency signals with the signals whose phases are shifted by 90°, an I component and a Q component which are subjected to orthogonal modulation are separated. The I component and the Q component are supplied through band-pass filters 616I and 616Q to analog/digital (A/D) converts 617I and 617Q and thereby samples. The A/D converts 617I and 617Q supplies the I component and the Q components as an I component AI and a Q component AQ received from the one antenna to a synthesizing circuit 618.

A reception signal from the other antenna is subjected to the similar processings. Specifically, an output in a band of 2 GHz of a reception signal from the other antenna is supplied through a buffer amplifier 621 to a mixer 622. The mixer 622 mixes the output signal with a frequency signal generated by a PLL circuit 632 based on the clock obtained at a terminal 631 to obtain an intermediate frequency signal. The mixer 622 supplies the intermediate frequency signal through a band-pass filter 623 and a buffer amplifier 624 to multipliers 625I and 625Q. The multipliers 625I and 625Q multiplies the supplied intermediate-frequency signals with one and the other outputs from a phase shifter 634. Since the multipliers 625I and 625Q multiplies the supplied intermediate-frequency signals with the signals whose phases are shifted by 90°, an I component and a Q component which are subjected to orthogonal modulation are separated. The I component and the Q component are supplied through band-pass filters 626I and 626Q to analog/digital (A/D) converts 627I and 627Q and thereby samples. The A/D converts 627I and 627Q supplies the I component and the Q components as an I component BI and a Q component BQ received from the one antenna to a synthesizing circuit 618.

Figure 22:
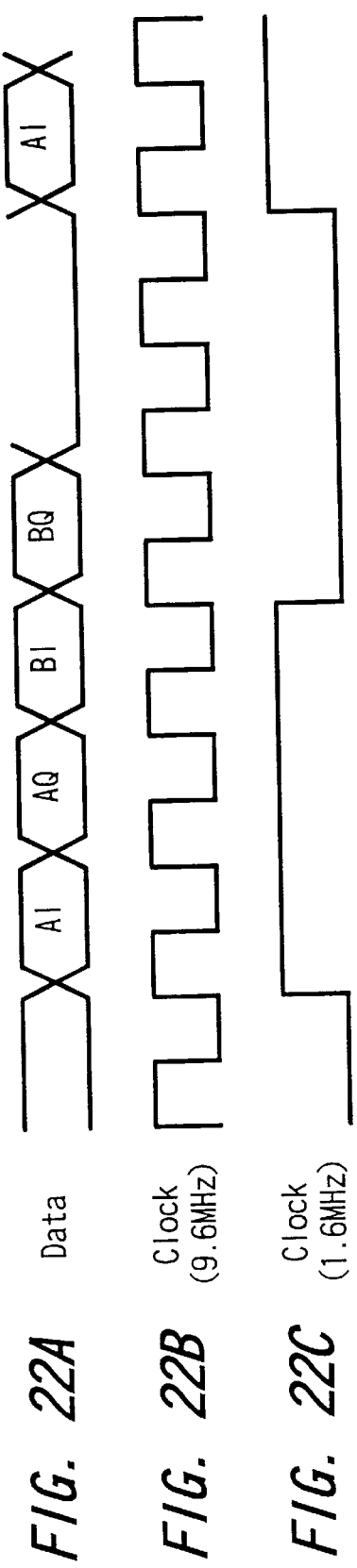
FIGS. 22A to 22C are timing charts showing timings of the reception processing according to the embodiment of the present invention.

The synthesizing circuit 618 synthesizes the reception signals of two systems and outputs a synthesized signal. As shown in FIG. 22, for example, in this synthesizing processing, the data AI, AQ, BI, BQ are output in a time division fashion in synchronization with the clocks of 9.6 MHz and 1.6 MHz.

Figure 23:
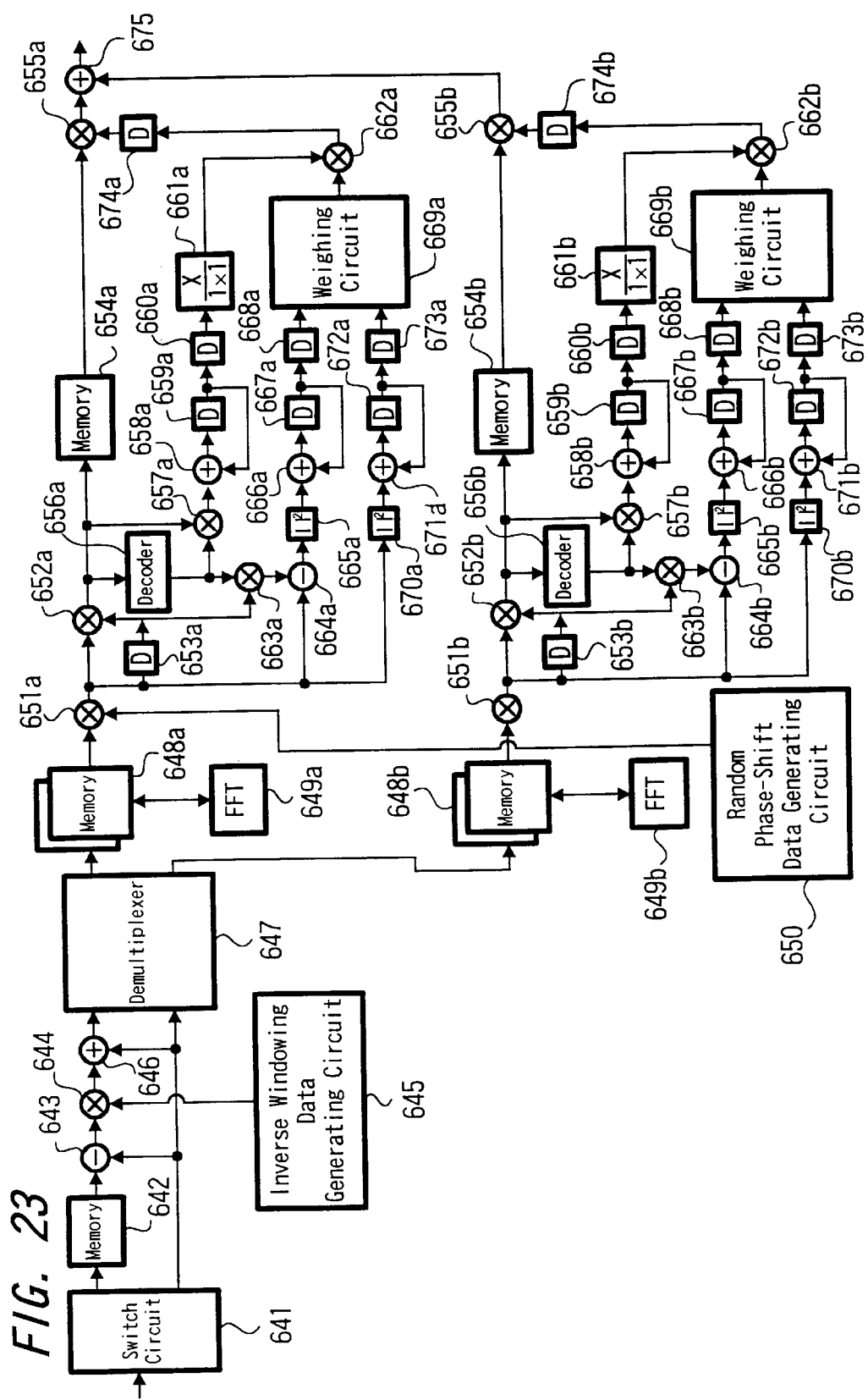
FIG. 23 is block diagram showing a demodulating processing of the base station according to the embodiment of the present invention.

An arrangement of each of the demodulating circuits 606a to 606p for demodulating the data thus received in the base station will be described with reference to FIG. 23. The output signals from the reception high-frequency carrier processing circuits 605a to 605p having the arrangement shown in FIG. 21 are supplied through a switching circuit 641 to a memory 642. An output from the memory 642 is supplied to a subtracter 643. The subtracter 643 calculates difference between the output from the memory 642 and an output directly from the switching circuit 641 to obtain a difference signal. The subtracter 643 supplies the difference data to a multiplier 644. The multiplier 644 multiplies the difference data with an inverse windowing data output from an inverse windowing data generating circuit 645 and supplies its multiplication output to an adder 646. The adder 646 adds the multiplication output with an output directly from the switching circuit 641 and supplies the addition output to a demultiplexer 647. The demultiplexer 647 is supplied with the output directly from the switching circuit 641 and separates a reception signal of one system (from the one antenna) and a reception signal of the other system (the other antenna).

Processings in each of the systems are common, and hence the processing of the reception signal of one system will be described. An output from the demultiplexer 647 is supplied to a memory 648a, and then an fast Fourier transform (FFT) circuit 649a connected thereto converts the multicarrier signal into a signal of an I system and supplies the I system signal to a multiplier 651a. The multiplier 651a multiplies the system signal with an output from a random phase-shift data generating circuit 650 to thereby carry out a processing of converting the data randomly phase-shifted upon transmission into a data having its original phase. The multiplier 651a supplies the data having the original phase directly to a multiplier 652a. The multiplier 652a is supplied with a data delayed by a delay circuit 653a by one symbol amount and carries out the differential demodulation, supplying the differential demodulated data to a buffer memory 654a. Based on the differential demodulated data, a processing for obtaining a soft decision data used for Viterbi decoding is carried out.

Specifically, the differential demodulated data is supplied to a decoder 656a to carry out the differential modulation again. The modulated data is supplied therefrom to a multiplier 657a. The multiplier 657a calculates difference between the modulated data and the differential demodulated data and supplies the difference data to an adder 658a. The adder 658a adds the difference data with an output from a delay circuit 659a to accumulate the data of difference. The adder 658a supplies the accumulated value through a delay circuit 660a to an averaging circuit 661a. The averaging circuit 661a supplies its output to a multiplier 662a. The data modulated again by the decoder 656a and the output from the delay circuit a 653a are supplied to a multiplier 663a and thereby multiplied. The multiplier 663a supplies the multiplication signal to a subtracter 664a. The subtracter 664a calculates difference between the multiplication signal and the output from the multiplier 651a to determine this difference data as a noise in a transmission path. The difference data is supplied to a squaring circuit 665a and squared thereby. The squaring circuit 665a converts a squared value into an absolute value and supplies the absolute value to an adder 666a. The adder 666a adds the value with an output from a delay circuit 667a to accumulate a noise data. The adder 666a supplies the accumulated value through a delay circuit 668a to a weighting circuit 669a. Moveover, an output from the multiplier 651a is supplied to a squaring circuit 670a and thereby squared. The squaring circuit 670a converts the squared value into an absolute value and supplies the absolute value to an adder 671a. The adder 671a adds the absolute value with an output from a delay circuit 672a to accumulate the data. The adder 671a supplies the accumulated value through the delay circuit 673a to the weighting circuit 669a.

The weighting circuit 669a carries out a previously set weighting processing and supplies a weighted value to a multiplier 662a. The multiplier 662a supplies its output through a delay circuit 674a to a multiplier 655a. The multiplier 655 multiplies the output from the multiplier 662a with the output from the memory 654a to obtain a soft decision data obtained by adding the differential demodulated data with a data indicative of a transmission status and used for Viterbi decoding. The multiplier 655a supplies the soft decision data to an adder 675. The adder 675 mixes the soft decision data with data of the other system. The processing in the other system will not be described. Circuits marked with a reference numeral b in FIG. 23 are processing circuits in the other system, being circuits for carrying out the same processings as those of the circuits marked with a reference numeral a in the one system.

As described above, since the base station according to this embodiment carries out only the processing for outputting the soft decision data used for Viterbi decoding as the reception processing for receiving the signal from the terminal apparatus and the succeeding processings are carried out by the exchange, it is possible to reduce processings in the base station to that extent. Similarly, since it is sufficient for the base station to carry out only the processing for modulating the data channel-coded by the exchange and the processing for transmitting the modulation signal as the processing for transmitting the data to the terminal apparatus, it is possible to reduce processings in the base station to that extent.

Therefore, it is possible to simplify the arrangement of the base station for the radio telephone system, and also it is possible to easily cope with a system change and so on. Specifically, if a data processing method such as a coding method or the like must be changed, it is sufficient to change the arrangement only in the exchange, and hence it is not necessary to change the arrangement in each of the base station, which allows the system to be comparatively easily changed. Moreover, since the exchange carries out the channel coding processing, upon the hand-off processing for switching the base station communicating with the terminal apparatus, it is possible to carry out the corresponding data processing on the exchange side, and hence it is possible to switch the base station at high speed (i.e., on a real-time base).

Values of the frequencies, time, coding rates and so on are described in this embodiment by way of example, and hence the present invention is not limited to the above embodiment. It is needless to say that the present invention can be applied to the modulation processing other than the DQPSK modulation in view of the modulation system.

In particular, the arrangement in which the exchange carries out the channel coding and the channel decoding of the digital data used for the radio communication and the base station carries out only the modulation and demodulation processings for the radio transmission can be radio telephone systems other than the communication system described in this embodiment. For example, the exchange may carry out the channel coding and the channel decoding in accordance with the CDMA system or the TDMA system, the base station carrying out only the modulation and demodulation processings for the radio transmission in accordance therewith and the processing accompanying the modulation and demodulation processings.

According to the communication method of the present invention, since the exchange carries out the data processing such as the channel coding and the channel decoding, it is sufficient for the base station to carry out only the processing for modulating the data transmitted from the exchange and the processing for demodulating the data received from the terminal apparatus. Therefore, it is possible for the exchange to carry out the processings collectively, and hence the processings in each of the base stations becomes simplified. Since, the data processing method such as the coding method or the like is changed, it is sufficient to change only the arrangement in the exchange, and hence it is not necessary to change the arrangement in each of the base stations, it is possible to change the system comparatively easily. Moreover, since the exchange carries out the channel coding processing, upon the hand-off processing for switching the base station communicating with the terminal apparatus, it is possible to switch the base station at high speed (i.e., on a real-time base).

In this case, it is possible for each of the base stations to easily process the signals when the following transmission system is employed. In the above transmission system, a plurality of transmission bands in each of which subcarrier signals of a predetermined number are allocated at a predetermined frequency interval are prepared, time slots are formed by dividing a signal of each transmission band by a predetermined time, the burst signal formed of the multicarrier signal obtained by modulating data with dispersing the subcarrier signals of the predetermined number intermittently at a period of time slots of a predetermined number is transmitted, the communication is carried out with employing a predetermined time slot of a first transmission band, and thereafter the transmission band is switched to the second transmission band to carry out the communication with employing a time slot succeeding the time slot of the first transmission band after a predetermined time, thereby the communication between the base station and the terminal apparatus being enabled to be satisfactorily carried out (i.e., in a state that the orthogonal relationship is established among the respective paths of the signals, the transmission band is effectively used, and in the satisfactory transmission state without interference with respect to other signals, multiple access in which a large number of paths can access the station can be carried out).

When this transmission system is employed, if the encoded data made in the form of packets is transmitted as the data transmitted from the exchange to the base station in each slot, then it is possible to transmit the satisfactorily processed data to the base station.

Moreover, when the above transmission system is employed, the soft decision data with respect to every slot is transmitted as the data transmitted from the base station to the exchange, then it is possible to transmit the satisfactorily processed data to the base station.

According to the communication system of the present invention, since the channel coding means the channel decoding means prepared in the exchange can collectively process the data transmitted through the respective base stations, it is possible to simplify the arrangement of each of the base stations, and hence it is possible to simplify the system arrangement of the radio telephone system in which the digital data is transmitted by wireless.

In this case, it is possible for each of the base stations to easily process the signals when the following transmission system is employed. In the above transmission system, a plurality of transmission bands in each of which subcarrier signals of a predetermined number are allocated at a predetermined frequency interval are prepared, time slots are formed by dividing a signal of each transmission band by a predetermined time, the burst signal formed of the multicarrier signal obtained by modulating data with dispersing the subcarrier signals of the predetermined number intermittently at a period of time slots of a predetermined number is transmitted, the communication is carried out with employing a predetermined time slot of a first transmission band, and thereafter the transmission band is switched to the second transmission band to carry out the communication with employing a time slot succeeding the time slot of the first transmission band after a predetermined time, thereby the communication between the base station and the terminal apparatus being enabled to be satisfactorily carried out (i.e., in a state that the orthogonal relationship is established among the respective paths of the signals, the transmission band is effectively used, and in the satisfactory transmission state without interference with respect to other signals, multiple access in which a large number of paths can access the station can be carried out).

When this transmission system is employed, the means for generating the encoded data made in the form of packets in each slot is provided in the exchange, it is not necessary for each of the base stations to carry out the processing for generating the encoded data, and hence it is possible to considerably simplify the arrangement of each of the base stations.

Moreover, when the above transmission system is employed, the base station is provided with the soft decision means for obtaining the soft decision data with respect to every slot and the soft decision data is transmitted to the exchange, it is not necessary for each of the base stations to carry out the processing for decoding the soft decision data, and hence it is possible to considerably simplify the arrangement of each of the base stations.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A transmission method for transmitting a signal in a predetermined transmission bandwidth with a predetermined transmission format for multiple access, comprising the steps of:

coding a signal at a position for managing the multiple access to produce a coded signal and transmitting said coded signal to a plurality of base stations;

modulating said coded signal at said plurality of base stations, respectively; and transmitting an output signal obtained in said modulating step at said plurality of base stations, wherein the coding step is only performed at said position for managing the multiple access and the modulating step is only performed at said plurality of base stations, and wherein said predetermined transmission format is a format employing a multicarrier signal which includes subcarriers of a predetermined number, each respectively separated at a predetermined frequency interval.

2. A transmission method according to claim 1, wherein said subcarriers comprise a first predetermined number and said predetermined transmission format further comprises time slots of a second predetermined number at a predetermined time interval.

3. A transmission method according to claim 2, wherein said subcarriers of the first predetermined number and said time slots of the second predetermined number are respectively made as groups of a third predetermined number.

4. A transmission method according to claim 1, wherein in said predetermined transmission format, said subcarriers are subjected to frequency hopping.

5. A reception method in a predetermined transmission bandwidth with a predetermined transmission format for multiple access, comprising the steps of:

receiving an RF signal at a plurality of base stations;

demodulating an output signal obtained in said receiving step at said plurality of base stations and transmitting a demodulated signal to a position for managing the multiple access, and decoding a signal at said position for managing the multiple access;

wherein the demodulating step is only performed at said plurality of base stations and the decoding step is only performed at said position for managing the multiple access, and wherein said predetermined transmission format is a format employing a multicarrier signal comprising subcarriers of a predetermined number each respectively separated by a predetermined frequency interval.

6. A reception method according to claim 5, wherein said subcarriers comprise a first predetermined number and said predetermined transmission format further comprises time slots of a second predetermined number at a predetermined time interval.

7. A reception method according to claim 6, wherein said subcarriers of the first predetermined number and said time slots of the second predetermined number are respectively made as groups of a third predetermined number.

8. A reception method according to claim 5, wherein in said predetermined transmission format, said subcarriers are subjected to frequency hopping.

9. A transmission apparatus employing a predetermined transmission bandwidth with a predetermined transmission format for multiple access, comprising:

multiple access managing means for coding a signal and transmitting a coded signal to a plurality of base stations; and said plurality of base stations including means for modulating an output from said multiple access managing means and transmitting a modulated signal, wherein the coding is only performed at said multiple access managing means and the modulation is only performed at said plurality of base stations, and wherein said predetermined transmission format employs a multicarrier signal which includes subcarriers of a predetermined number, each respectively separated by a predetermined frequency interval.

10. A transmission apparatus according to claim 9, wherein said subcarriers comprise a first predetermined number and said predetermined transmission format further comprises time slots of a second predetermined number at a predetermined time interval.

11. A transmission apparatus according to claim 10, wherein said subcarriers of the first predetermined number and said time slots of the second predetermined number are respectively made as groups of a third predetermined number.

12. A transmission apparatus according to claim 9, wherein in said predetermined transmission format, said subcarriers are subjected to frequency hopping.

13. A reception apparatus employing a predetermined transmission bandwidth with a predetermined transmission format for multiple access, comprising:

a plurality of base stations for receiving RF signals, demodulating said received RF signals, and transmitting a demodulated signal to multiple access managing means; and said multiple access managing means including means for decoding output signals from said plurality of base stations, wherein said demodulation is only performed at said plurality of base stations and said decoding is only performed at said multiple access managing means, and wherein said predetermined transmission format employs a multicarrier signal including subcarriers of a predetermined number, each respectively separated by a predetermined frequency interval.

14. A reception apparatus according to claim 13, wherein said plurality of subcarriers comprises a first predetermined number and said predetermined transmission format further comprises time slots of a second predetermined number at a predetermined time interval.

15. A reception apparatus according to claim 14, wherein said subcarriers of the first predetermined number and said time slots of the second predetermined number are respectively made as groups of a third predetermined number.

16. A redeption apparatus according to claim 13, wherein in said prefetermined transmission format, said subcarriers are subjected to frequency hopping.

* * * * *